US006741853B1

(12) United States Patent
Jiang et al.

(10) Patent No.: US 6,741,853 B1
(45) Date of Patent: May 25, 2004

(54) DEVICE AWARE INTERNET PORTAL

(75) Inventors: Hua Jiang, Plano, TX (US); Hee C. Lee, Plano, TX (US); Kalyan K. Basu, Plano, TX (US); Chang Yu, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 592 days.

(21) Appl. No.: 09/711,223

(22) Filed: Nov. 9, 2000

(51) Int. Cl.[7] .......................... H04M 3/493; G06F 13/00
(52) U.S. Cl. .................. 455/418; 455/414.1; 455/41.2; 455/445; 709/223; 709/230; 709/219
(58) Field of Search .............................. 455/414.1, 418, 455/41.2, 422.1, 426.1, 426.2, 435.1, 435.2, 445, 454, 456.5, 461, 462, 566; 709/203, 206, 220, 230, 222, 223, 249, 330, 311, 250, 238

(56) References Cited

U.S. PATENT DOCUMENTS 5,924,026 A * 7/1999 Krishnan ................. 455/414.1
6,237,035 B1 * 5/2001 Himmel et al. ............. 709/224
6,336,137 B1 * 1/2002 Lee et al. .................... 709/219
6,421,714 B1 * 7/2002 Rai et al. .................... 709/217
6,473,097 B1 * 10/2002 Elliott ........................ 709/203
6,512,754 B2 * 1/2003 Feder et al. ................ 455/418
6,523,062 B1 * 2/2003 Bridgman et al. .......... 709/203
6,563,800 B1 * 5/2003 Salo et al. .................. 370/264
2002/0059402 A1 * 5/2002 Belanger .................... 709/220

FOREIGN PATENT DOCUMENTS

CH      EP 1 156 649 A1 * 11/2001  .......... H04M/3/493

* cited by examiner

Primary Examiner—Sinh Tran
Assistant Examiner—K Afshar
(74) Attorney, Agent, or Firm—Carr LLP

(57) ABSTRACT

A method for providing information to devices in a format preferable to a device type. This is achieved by receiving an information request, detecting the device type from which the information request originated, adapting the content for presentation on the device type, and presenting the information to the device. By the use of this invention, telecommunications users are presented information in a format suitable to the device being used.

9 Claims, 22 Drawing Sheets

FIGURE 18

| | | Desktop Computer | PSTN Phone | Laptop Computer | PDA | Cellular (Browser) | Cellular (Voice) |
|---|---|---|---|---|---|---|---|
| Profile | Permanent | 1 | 1 | 1 | 1 | 1 | 1 |
| | Temporary | 2 | 2 | 2 | 2 | 2 | 2 |
| Registration | Automatic | 3 | 0 | 3 | 3 | 0 | 0 |
| | Manual | 7 | 6 | 7 | 7 | 7 | 6 |
| On-line Detection | Internal | 6 | 7 | 6 | 6 | 6 | 7 |
| | External | 5 | 0 | 5 | 5 | 0 | 0 |
| Query | | 0 | 0 | 4 | 4 | 4 | 4 |
| User Over-ride | | | | | | | |

1810 Profile
1812
1814 Registration
1816
1818 On-line Detection
1820
1822 Query
1824 User Over-ride

DEVICE AWARE INTERNET PORTAL

TECHNICAL FIELD

The invention relates generally to wireless communications and, more particularly, to the device-dependent delivery of data to a wireless device.

BACKGROUND

With the advent of wireless communications has come a multitude of wireless devices fulfilling specific needs of wireless device users. The devices have given users increased mobility and a greater access to information, all in an effort to better and easily manage their daily lives. The devices, however, are typically limited to a specific function, requiring users to maintain multiple devices for the various aspects of their lives. Additionally, since the current technologies and protocols in the wireless communications network do not allow interchangeable devices, the same information is not accessible on all devices.

This problem, although applicable in any information network, is particularly apparent in wireless access to the Internet, as illustrated in FIG. 1. The Mobile Station (MS) 110–16 user subscribes to a Wireless Access Network Provider (WANP) 120–126 that provides users with a Radio Frequency (RF) 130–36 interface to the Wireless Communications Network (not shown) and the Internet 150. The RF interface comprises a RF carrier and a protocol. The RF carrier, which includes the messaging format for control and user data such as Time Division Multiple Access (TDMA), Code Division Multiple Access (CDMA), and Global System for Mobile Communications (GSM), among others, vary widely, and, as a result, a single MS typically supports only one of the possible RF interfaces. Furthermore, it is common for a WANP, such as AT&T, Sprint PCS, or AirTouch, to provide services for only a single RF carrier. As a result, MS users are typically restricted to not only a specific RF interface, but also to a particular WANP within any given area.

Moreover, the protocol and presentation formats vary between devices. In comparison with wired data networks, wireless networks must support a variety of MSs: voice-only cellular phones, mini-browser enabled cellular phones (commonly referred to as a WAP phone), Personal Digital Assistants (PDAs), one-way pagers, two-way pagers, and laptop computers. These devices, however, employ different communication protocols, such as Wireless Application Protocol (WAP), Hyper-Text Transfer Protocol (HTTP), and voice communication links. Additionally, the application typically employ different presentation formats, such as Hyper-Text Markup Language (HTML), Wireless Markup Language (WML), and Handheld Device Markup Language (HDML). Because of the relationship between the MS and the RF interfaces and presentation formats, a user is limited to service providers that support a particular RF carrier, protocol, and presentation format. As a result, a user typically subscribes to multiple service providers, one for each MS owned.

Additionally, the MS and its capabilities vary. Unique characteristics of each MS, such as the input capabilities, display capabilities, amount of memory, and bandwidth, create a situation such that the preferred method of communication with one may be inappropriate for another. While some MSs have significant capabilities, such as a laptop computer, other MSs, such as PDAs, mini-browser enabled cellular phones, or voice-only phones, have significantly limited capabilities.

PDAs are becoming an increasingly popular way for MS users to remain connected. While a PDA has considerable capabilities, such as e-mail, contacts, and calendar functions, a PDA's capabilities are limited compared to a laptop computer. The display size is smaller, the processing capability is less, and, most importantly, the data entry is significantly limited. Data entry in particular is a limiting factor in the use of a PDA, as well as others, to send or retrieve information.

While a device such as a PDA is capable of entering the same data as a laptop or desktop computer, the ease of use and the amount of time required to enter the data significantly limits the functionality of the device. Data entry with a PDA is typically achieved through the use of a stylus and a touch sensitive screen. Generally, a miniature diagram of a keyboard is displayed on which a stylus is used to indicate the keys. The size of the displayed keyboard and the use of a single stylus significantly limit the ability of a user to enter large amounts of data on a PDA.

A mini-browser phone is more limiting. The display is large enough for only a small amount of data, and alphanumeric character entry is extremely difficult, typically requiring depressing a combination of keys or a sequence of keys to enter a single character. Other wireless devices, such as wireless phones and pagers, are typically capable of displaying only the most basic messages.

After the MS has access to a WANP, the MS must also subscribe to one or more wireless portals 140–46. The portal provides the MS with links to content and service sites, web server functionality, and network access to the Internet 150. It is common in the industry for the WANP to provide the dial-up access and the web server functionality. Unfortunately, each WANP and MS vendor typically supports only a single type of device and/or RF interface.

Therefore, the MS user typically maintains as many portals as devices. The various accounts, however, are separate and distinct services providing little or no integration between MSs. Information and services available on one MS are generally unavailable on other MSs, regardless of the information content or MS capabilities.

Once connected to a wireless portal, the MS has Internet access to information provided by Internet Content Providers (ICPs) 160, which typically allow customization of the displayed information to suit a user's specific needs. The information, however, is not specific to a particular device and as such may be displayed in a unusable format to the MS user.

As a result, the current architecture does not support operation of multiple MSs while maintaining a single means of access to a variety of information and services. The requirement for an MS user to subscribe to separate WANPs and ISPs for each MS device prevents a seamless integration between the devices. As a result, for the MS user to have access to all information, the MS user must simultaneously possess and operate the various devices, complicating instead of easing the MS user's life.

In addition to problems in providing a seamless integration of devices and services, the architecture described above results in specific problems: providing information that requires data entry, providing location-based services, and providing automatic notification of specified events, as well as others. Furthermore, since the device characteristics vary, it is difficult to determine how best to display the requested information.

ONE-CLICK DATA ENTRY

Data entry in the wireless environment is particularly challenging because, as stated above, many of the wireless devices have limited, or an extremely difficult, means of entering alphanumeric data, in addition to being susceptible to security breaches as someone eavesdrops on the RF signal. Devices such as PDAs and wireless Internet browsers typically have only a few keys with which to enter data. Often, the entering of a single character entails depressing a single key multiple times or depressing a combination of keys. The entering of character strings becomes increasingly difficult and time consuming as the length of the string increases.

Other devices, however, may have more capability to enter alphanumeric data but are not secure methods to enter secret data. Wireless devices communicate via RFs that are available to anyone with the appropriate equipment and technology to intercept and decode the signal. Therefore, if secret data, such as passwords and account numbers, are sent, the possibility that someone gains access to private information increases.

These limitations particularly restrict a wireless device's use of many applications. For instance, many Internet web sites provide subscription services that allow users to customize displayed information to suit his/her specific needs and desires. The ICPs generally protect the user's information by means of a unique user identifier and password, or other such authentication means. The user is then prompted for the authentication information before access is allowed. Requiring the user to enter their user id and password with a device with limited data entry capabilities are often prohibitive and discourage use.

ICPs and web browsers often implement an authentication means called a cookie. A cookie is an industry standard mechanism in which an ICP stores user information in a predetermined location on the user's device. The ICP automatically verifies the user information in the cookie when the user accesses the web site. If the user's authentication information is contained in the cookie, the user is automatically granted access to the web site, as customized by the user, without further interaction. If the user's authentication information is not contained in the cookie, the user must manually enter the authentication information manually.

While the cookie authentication mechanism is extremely useful in a desktop environment where the user's device is stationary and provides greater capabilities, the cookie is not useful for wireless devices. First, the use of cookies is not supported by the standard protocols, such as Wireless Application Protocol (WAP). Second, even if cookies were supported by the protocols, the use of cookies stored on a wireless device poses a security risk in the interception of the RF transmission of the cookies and in the potential loss of the wireless device, thereby potentially allowing access to private account information to unauthorized individuals. Finally, MSs have limited capabilities and are frequently unable to perform the complicated authentication procedure. Even if it was capable, the authentication procedure would take valuable bandwidth that further exasperates the problems of wireless networks.

LOCATION-BASED SERVICES

Another limitation of the use of MSs for information-based services is the inability to provide location-based information. Services such as restaurant guides, weather, and movie guides, among others, are popular services based on a particular location. In the landline environment the problem is easier to solve: the user's location may be known, such as Caller-ID or a known home dial-up connection; or the service provider may request the user to input the location information. Since Caller-ID or a known MS is meaningless as a means for determining a wireless user's location, and, as described above, the entry of data in the wireless environment is difficult or impossible, location-based services are problematic to the MS user.

The issues with using a location-based service from an MS can be grouped into two categories. First, the mobile user may not know his/her location in terms required by the ICP. For instance, even if the ICP required only a zip code, it is typical for a mobile user, even within the confines of a city, to move from one zip code to another or venture into an unfamiliar part of the city. Additionally, many MS users are travelers completely unfamiliar with their location. In such a situation, it is literally impossible to provide their location, even without any other limitation.

The second category is the inability of the MS user to easily enter the location information, provided it is known. As described above, the limitation of the MS user to enter data easily discourages the user from requesting location-based services.

Prior attempts to resolve these issues have been unsuccessful. In one such attempt, the ICP requests the MS location from the wireless network via the Signaling System 7 (SS7) network. The information, however, presents a security and privacy issue as the information passes through the Internet and is susceptible to interception. As a result, the ability of the wireless network to provide the location of a mobile user is limited and, possibly, prohibited.

Another attempt to gain access to the location information merges the ICP with the wireless provider. In this situation, the service provider has access to the mobile user's location without requesting the information from an outside source or transmitting the information over the Internet. This implementation, however, is extremely costly to create and provides poor scalability for the provider.

SMART PUSH

Yet another problem experienced by service providers is the inability to accurately deliver messages to users. Message delivery services typically consist of two types: push messages or pull messages. Push messages, such as e-mail, pages, scheduling events, stock quotes, weather, and sports information, among others, are generally delivered at a specified time or event. Delivery is made to a predetermined device and is made regardless of the user's status, device status, or message content. Therefore, if a message is sent to an MS that is not activated or is unavailable to the user, the information may not reach the MS user. Additionally, if the information was of such a type that the information cannot be displayed accurately on the device, the information may be meaningless to the mobile user. Message delivery, therefore, is not guaranteed to reach the mobile user in a useable format.

Pull messages, on the other hand, are the typical requests made by the user. The ICP returns information to the MS user on the device from which the request was submitted. While the MS is known and there is a higher likelihood the information will reach the user, the user must make an explicit request for each pull message.

DEVICE AWARE

Yet still another common problem of ICPs and MS users is that the wide diversity of MSs to suit a user's particular needs often result in communications in a manner not optimal for that particular device. Capabilities, such as the display size and quality, the amount of memory, and the input mechanisms, vary between the MSs' and, as a result, so do the preferred communication method.

Service providers and content providers generally provide information in a particular format, such as Hyper-Text Markup Language (HTML) or Wireless Markup Language (WML), without regard to the specific device on which the information is displayed. As a result, information for all wireless devices is provided in one particular format, regardless of the device characteristics. Information that is designed for display on a laptop or PDA, for instance, is unlikely to be displayed in an easily readable and accessible format on a web phone.

Additionally, the amount of memory affects the method of communication. If the MS's memory is sufficient, an application can utilize the additional memory and download additional information to the device in anticipation of a user's request while the user is reading the first page. For instance, when the user requests a lengthy report, succeeding pages can be downloaded and accessible to the user on demand while the user is reading a particular page.

Furthermore, as stated above, devices vary as to the ability of the user to enter data. Preferably, the information would be displayed in such a format as to accommodate the user's device, not only in terms of display but also in terms of requiring input. For instance, if a device has limited data entry capabilities, requested data is determined by a series of selections as opposed to a query that requires entering a lengthy string.

This creates problems not only between types of MSs, such as laptop computers and PDAs, but also between MS models, such as models of PDAs. For instance, the capability between the various PDA models can vary greatly in terms of memory, display controls, and size, among others.

Therefore, there is a need, either independently or in combination with other needs discussed herein, for a method and apparatus for providing information to a device in a format dependent on the type of device.

SUMMARY

The present invention provides a method to determine the type of the user's device and format the requested information accordingly. The method comprises detecting the device type, adapting the content for the intended device, and delivering the information.

BRIEF DESCRIPTION OF THE DRAWINGS

For a more complete understanding of the present invention, and the advantages thereof, reference is now made to the following descriptions taken in conjunction with the accompanying drawings, in which:

FIG. 18 is a chart illustrating one embodiment in which the priorities of the MSs are determined;

DETAILED DESCRIPTION

The principles of the present invention and their advantages are best understood by referring to the illustrated embodiment depicted in FIGS. 2–20.

Figure 1:
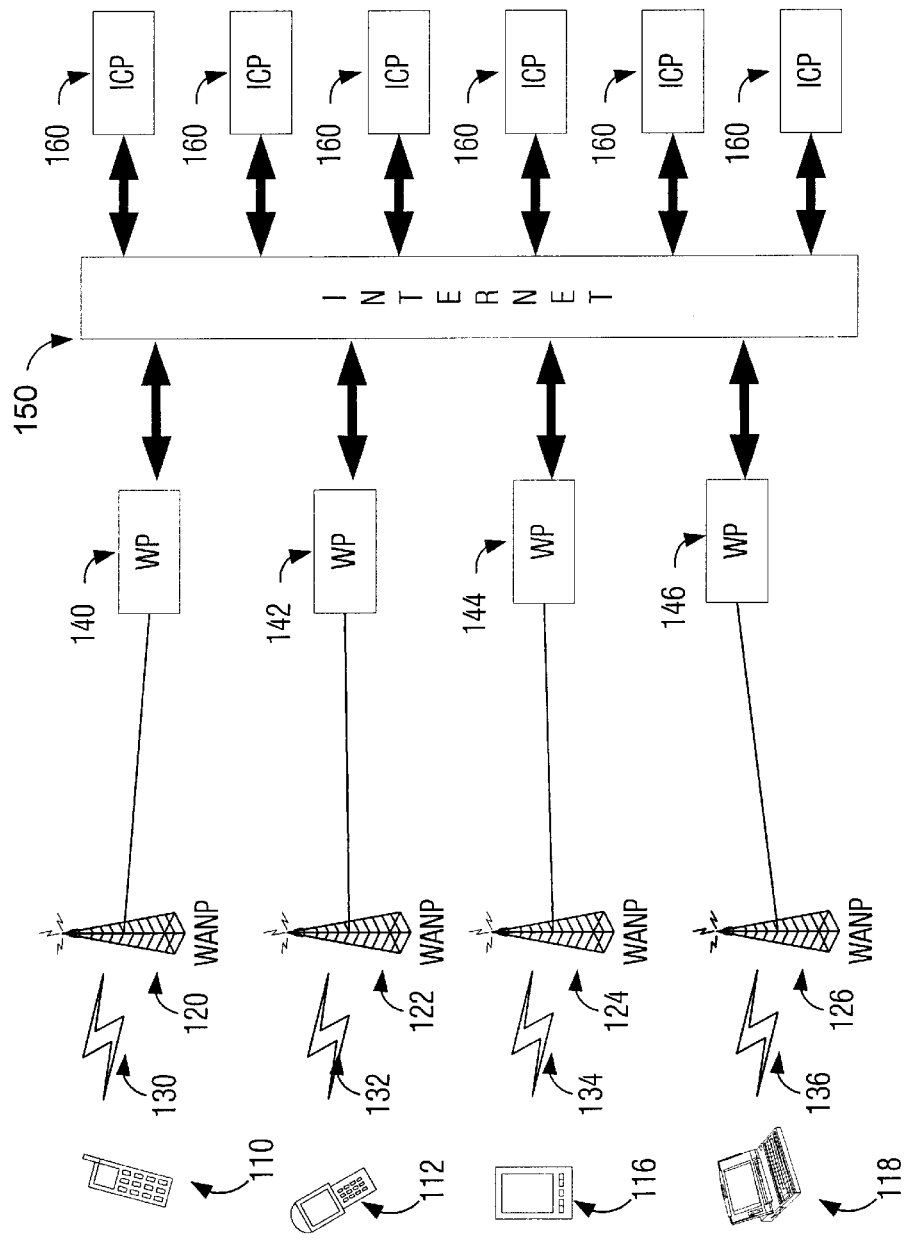
FIG. 1 schematically depicts the typical network environment of the prior art.
Figure 2:
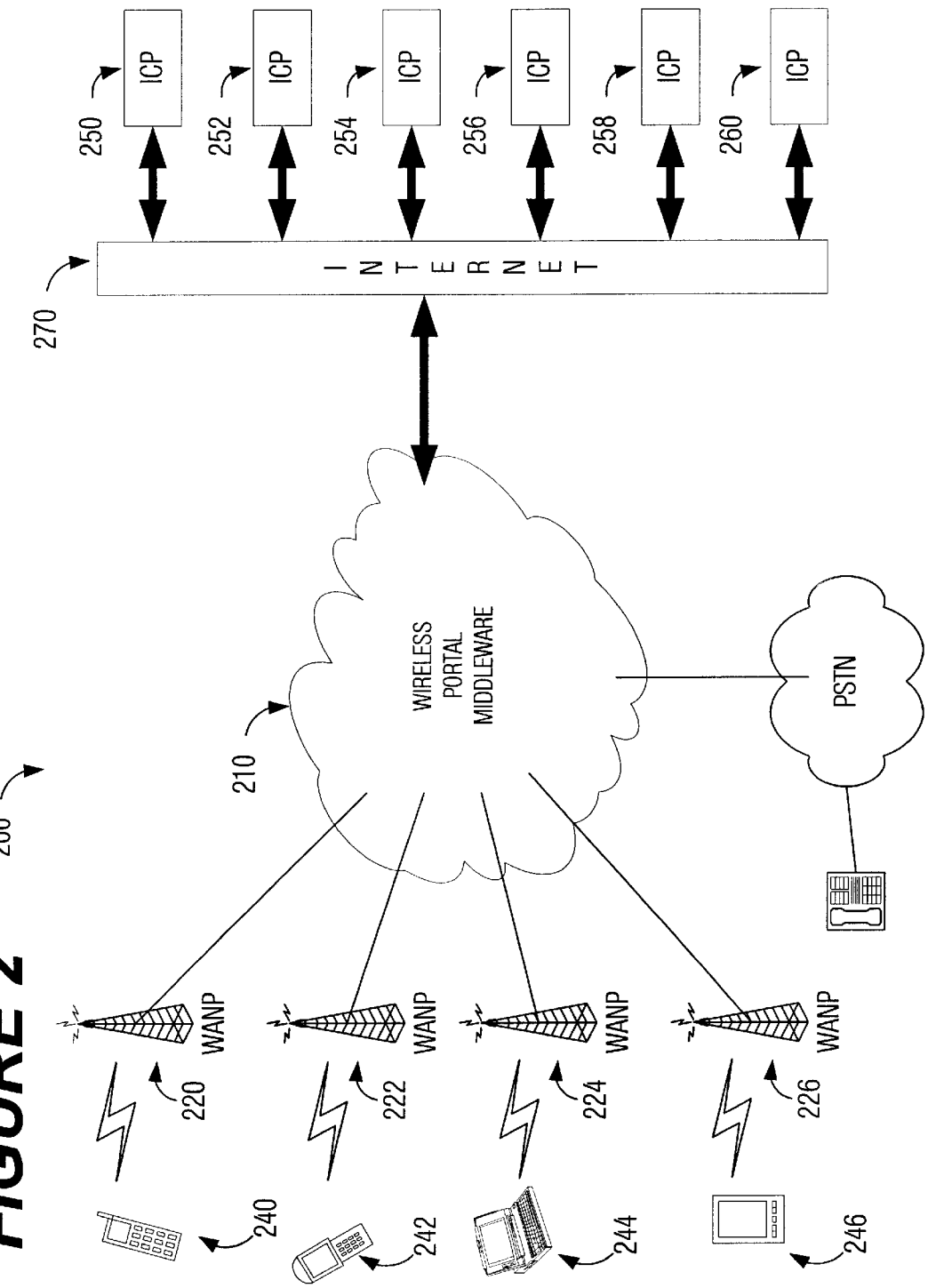
FIG. 2 schematically depicts one embodiment of a network that embodies the present invention.

Referring to FIG. 2 of the drawings, the reference numeral 200 generally designates a wireless communication system, which embodies features of the present invention. Specifically, a method for integrating services and features comprising a Wireless Portal Middleware (WPM) 210 connected to a plurality of Wireless Access Network Providers (WANP) 220–26 and the Internet 270, wherein the WPM 210 provides a single portal through which a user's MSs 240–46 communicate with ICPs 250–60 via the Internet 270.

The WPM 210 is a programmable platform, providing functionality and interfaces for implementing telecommunication services, such as voice mail, e-mail, and Personal Information Management (PIM), and Internet access services. Additionally, the WPM 210 is a scaleable platform, allowing value-added services to be added without hardware and software restructuring. The WPM's standard and open interfaces to wireless and wireline networks allow service providers to integrate service offerings as networks and technologies evolve. Additionally, the WPM provides a services platform from which memory and processor intensive applications are performed and accessible from multiple devices, reducing the need for more powerful MSs and increasing the capability of MSs.

Moreover, the combination of the above features allow the WPM 210 to provide a services platform from which integrated services that allow a variety of services and features to interact independent of the access method or type of device are performed.

Furthermore, unlike the prior art discussed above, typically requiring an MS user to subscribe to a portal for each MS, the present invention's novel and useful feature allows a plurality of devices to access services and information from a single portal. A single portal allows value-added services that provide a seamless integration between the various wireless and wireline devices, providing a mechanism to share data and information between MSs, limiting the impact of device-dependent protocols and service providers. Furthermore, the WPM 210 provides MS users seamless access to information networks regardless of the type of device available to the user, whether it is a cell phone 240, a mini-browser phone 242, a laptop computer 244, or a PDA 246, among others, by providing a central repository for subscriber information and services.

Figure 3:
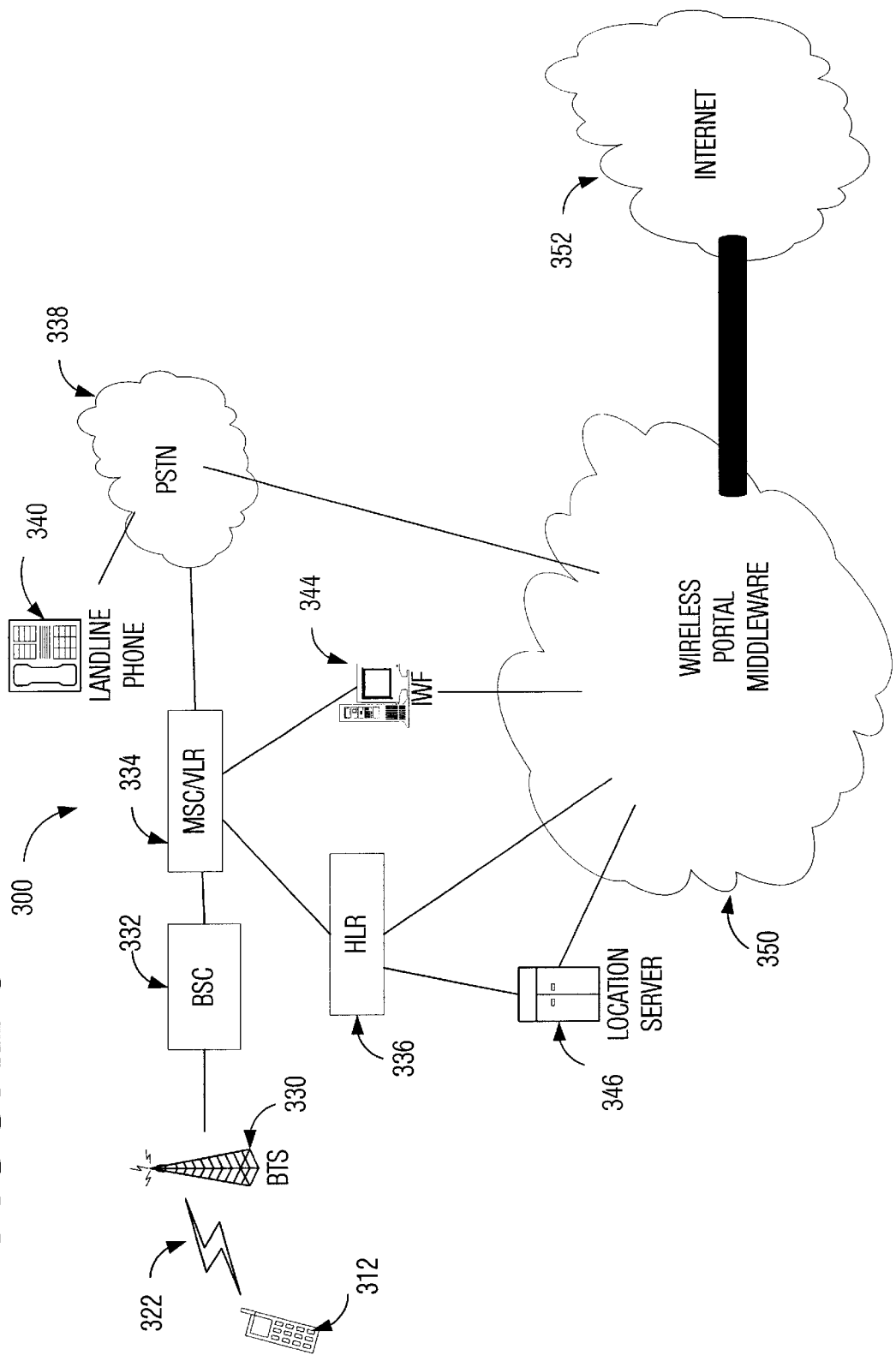
FIG. 3 depicts one embodiment of FIG. 2, in which the Wireless Access Network Provider is a Second Generation Circuit Switched Data network.

FIG. 3 illustrates a portion of a wireless Second Generation Circuit Switched Data network (2G CSD), which embodies features of the present invention. Specifically, the wireless communication portion includes a plurality of MSs 312 communicating via RF signals 322 to a Base Transceiver Station (BTS) 330. The Base Station Controller (BSC) 332 controls the operation of the BTS 330. The BSC 332 routes the call and the signaling information to the Mobile Switching Center (MSC) and Visitor Location Register (VLR) 334. The MSC/VLR 334 interfaces to the Home Location Register (HLR) 336 and the Public Switched Telephone Network (PSTN) 338 for user authorization and call routing purposes. The PSTN 338 also provides wired users 340 access to the WPM via other means, such as a voice access, or a network/dial-up connection.

Optionally, an Inter-Working Function (IWF) 344 may be available. The IWF 344 is generally specific to the 2G CSD networks and provides an alternate path of communication between the wireless networks and the Internet. The connection between the IWF and the WPM is preferably a Fast Ethernet connection with Layer 2 Tunnel Protocol (L2TP) for extending the PPP protocol to the WPM. Although the connection to the IWF is typically a Fast Ethernet connection, other connections, such as fiber, may be used.

Optionally, a location server 346 may be available in the wireless communications network. The location server 346 connects to the HLR 336, typically via a Signaling System 7 (SS7) link, to obtain MS location information. The form of location information retrieved from the location server 346 is dependent on the type of wireless communications network. For instance, GSM provides a cell ID, and CDMA and TDMA provide an MSC ID. The location information is received by the WPM 350 and converted to a format required by the users' function, as discussed below. Importantly, the location server 346 is the access point for location information retrieval from the wireless networks and is owned and controlled by the wireless network provider. Therefore, the access of private information, such as the user's location, is protected, providing the WPM with a secure method of gaining access to the user's location.

Wireless telecommunications and the functioning of the above-mentioned components, except the WPM, are considered well-known in the art and will therefore not be discussed in further detail herein, except insofar as necessary to describe the present invention.

Figure 4:
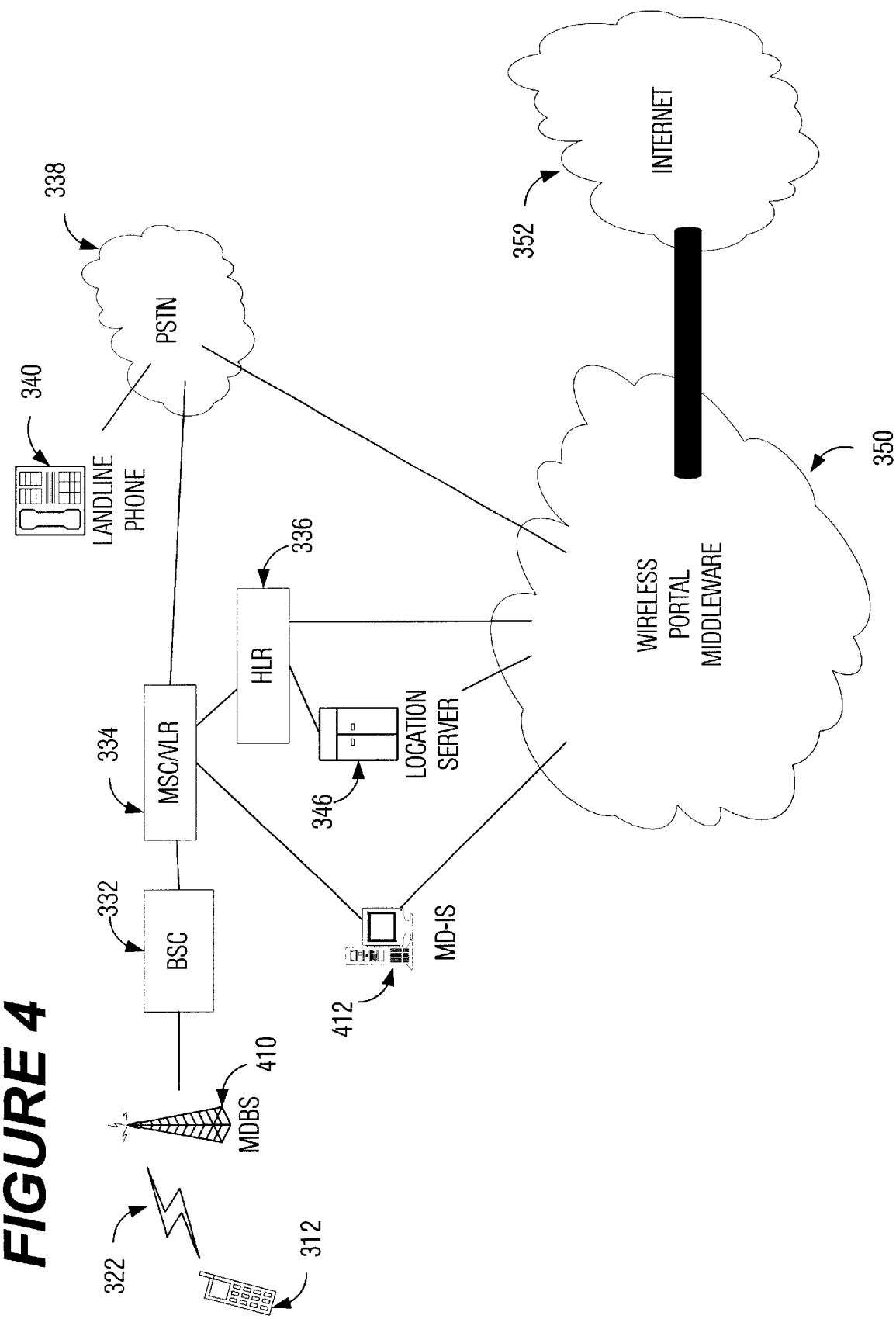
FIG. 4 depicts one embodiment of FIG. 2, in which the Wireless Access Network Provider is a Cellular Digital Packet Data network.

In an alternate embodiment, FIG. 4 depicts a network architecture in a Cellular Digital Packet Data (CDPD) network, which provides packet data services as an overlay onto existing analog cellular networks and is commonly used to provide Internet access for PDA users. In this scenario, the BTS 330 of FIG. 3 is replaced with a Mobile Data Base Station (MDBS) 410, which is a BTS that is compatible with the CDPD networks. The Mobile Data-Intermediate System (MD-IS) 412 provides a switching function between network elements as well as providing network access into the CDPD network to the WPM.

Figure 5:
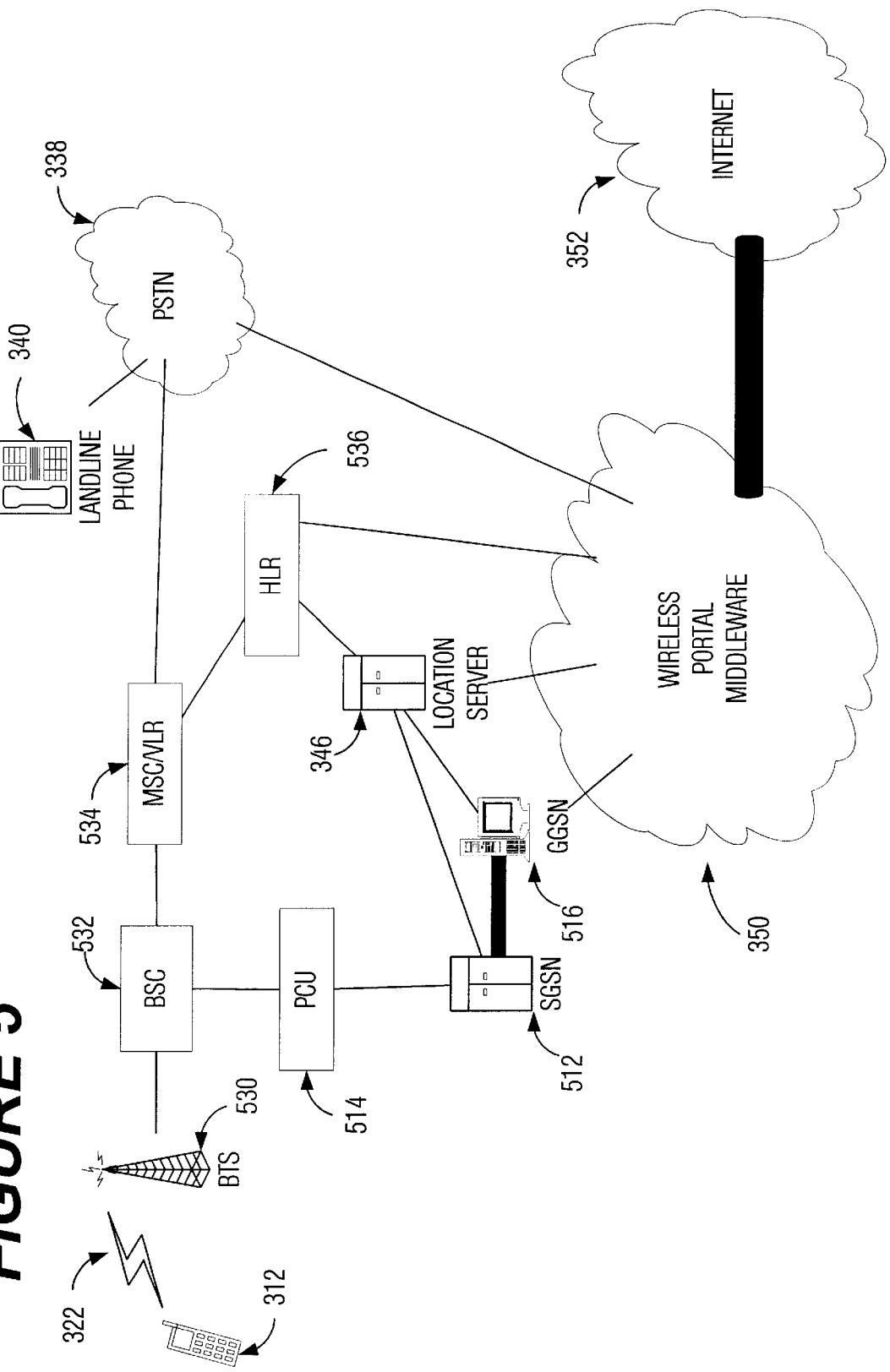
FIG. 5 depicts one embodiment of FIG. 2, in which the Wireless Access Network Provider is a General Packet Radio Service network.

As yet another embodiment of the present invention, FIG. 5 depicts the WPM interfacing with a General Packet Radio Service (GPRS) or, similarly, a Universal Mobile Telecommunications Systems (UMTS) wireless network. GPRS data service provides high speed data access via packet data in Global System for Mobile Communications (GSM) networks. GPRS packets are sent from the BSC 510 to the Serving GPRS Support Node (SGSN) 512 via the Packet Control Unit (PCU) 514. From the SGSN the packets are sent to the Gateway GPRS Support Node (GGSN) 516, which provides access to other networks, such as the Internet and the like.

Figure 6:
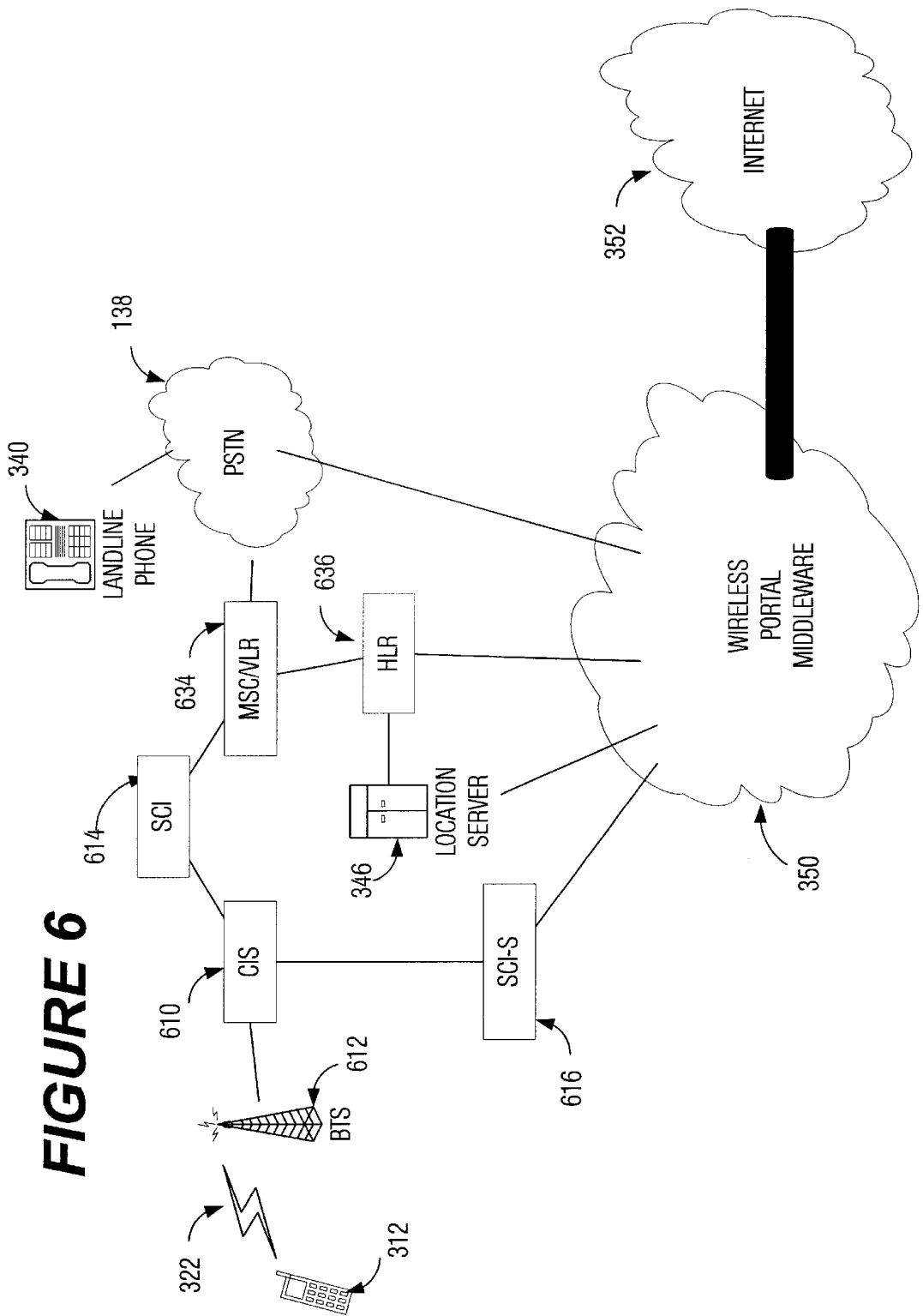
FIG. 6 depicts one embodiment of FIG. 2, in which the Wireless Access Network Provider is a CDMA 1x Standards Radio Telecommunications Technology network.

Yet still another embodiment of the present invention is depicted in FIG. 6 for CDMA 1x Standards Radio Telecommunications Technology (1xRTT) networks. In this situation, the CDMA Interconnect Subsystem (CIS) 610 interconnects the BTS 612 to the System Controller Interface (SCI) 614 and the System Controller Interface Server (SCI-S) 616 to provide a switching function and data access.

While FIGS. 3–6 describe particular wireless networks, the WPM is capable of interfacing with multiple wireless networks simultaneously. It is expected that single devices capable of interfacing to all of these, among others, will be developed. As one of the advantages of the WPM is providing a single interface to the end user regardless of the type of device or access method, it is also expected that the novel and useful features of the present invention apply equally to other networking methods, regardless of the type or method of access.

Figure 7:
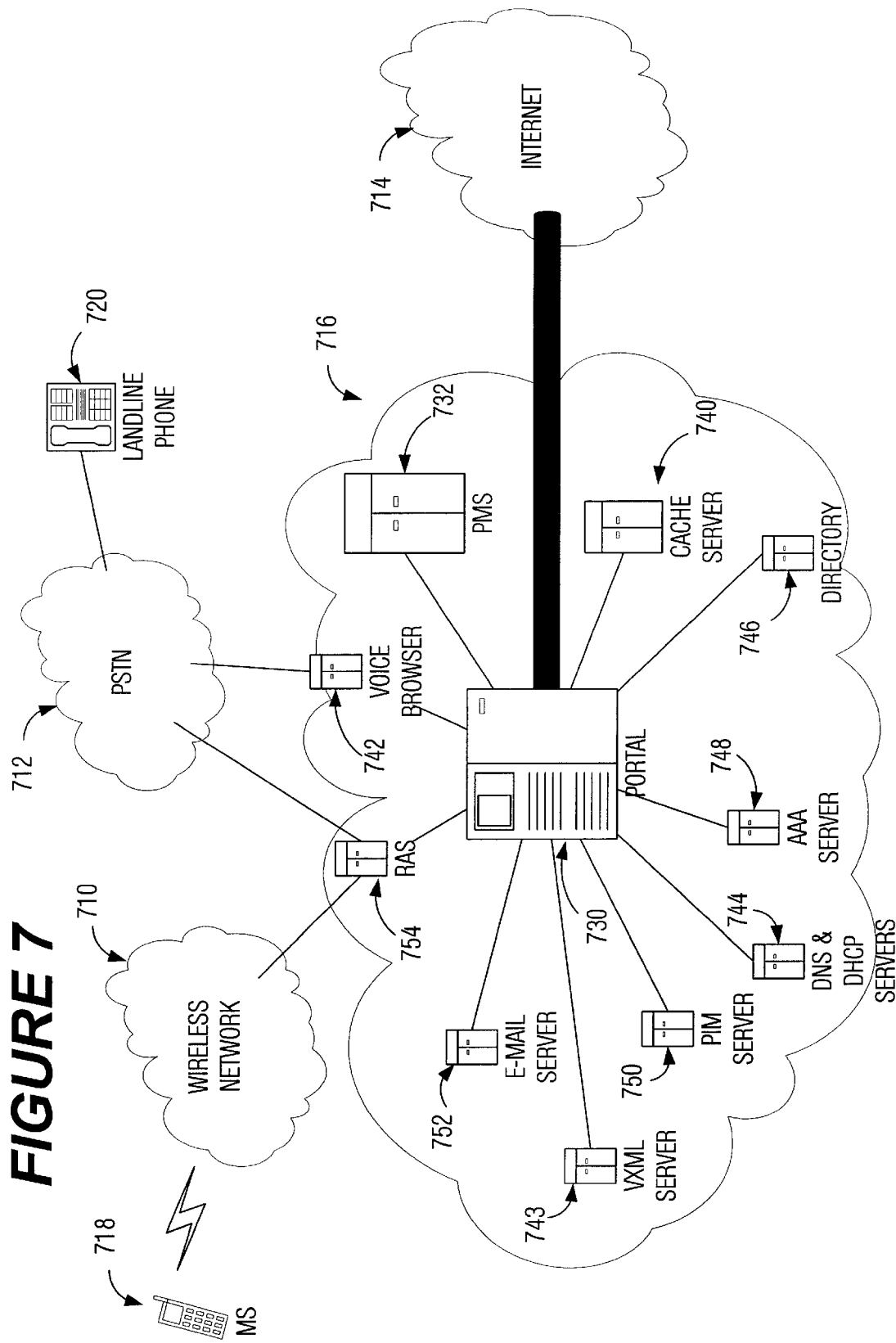
FIG. 7 schematically depicts one embodiment of the present invention.

FIG. 7 depicts the components and the internal architecture of one particular embodiment of the present invention. Internally, the WPM preferably utilizes distributed processing and employs a plurality of servers. Controlling the WPM 716 is the portal 730 and the Portal Middleware Server (PMS) 732. The portal 730 is a programmable router, such as a Shasta 5000 Router manufactured by Nortel Networks Corp., that provides termination of Point-to-Point Protocol (PPP) messaging, edge routing, captive portal, and firewall capabilities. The portal 730 is preferably configurable to re-route data packets to the PMS 732 based on the destination address and the packet type, allowing for quick deployment of additional servers and services. Additionally, the portal provides connectivity to the Internet, preferably via a fiber connection, and provides standard interfaces to wireless networks, such as analog, TDMA, CDMA, CDPD, 1xRTT, GPRS, Enhanced Data Rates for Global Evolution (EDGE), CDMA2000, UMTS, and wireless LAN (IEEE 802.11b).

The PMS 732 is the central control point for service characteristics and interaction between the services and system capabilities. The PMS recognizes different wireless devices, acquires information, converts between different protocols and formats, organizes personalized configurations and content, and manages the user's session.

The WPM optionally encapsulates other servers to provide services that are not otherwise available in the communications networks, or are available but not integrated with other services. It will be obvious to one skilled in the art that servers may be added or deleted dependent on the type of service provided and the capabilities located elsewhere in the communications network. Namely, a cache server 740, voice browser 742, Voice Extended Markup Language (VXML) server 743, domain name server (DNS) and Dynamic Host Control Protocol (DHCP) servers 744, directory 746, Authentication, Authorization, Accounting (AAA) server 748, a Personal Information Management (PIM) server 750, and an e-mail server 752 have been found to be useful.

The cache server 740 provides additional storage for service and user information. Features, such as the Smart Push, among others, described below may require additional storage for the delivery of messages. By providing for a cache server 740, the WPM is easily scaleable as the system requirements increase.

The voice browser 742 and the VXML server 743 provide a means for a voice-only device to easily navigate without the need for complicated data entry.

The DNS and DHCP servers 744 provide Internet Name and Address Management (INA). The INA manages static addressing (the DNS functionality) and dynamic addressing (DHCP functionality) in the Internet Service Provider (ISP) or enterprise domains, providing the WPM IP name and address conversion, and IP addresses assignment in the IP infrastructure.

The directory 746 provides a storage system for profile schemas and other user information. Additionally, the directory provides authentication data and user access privileges for the AAA server 748 usage.

The AAA server 748, such as the Preside RADIUS Server, provides AAA management and services. The WPM AAA services verify incoming users' identity, authorize users' access to services and network resources, and bill users appropriately for services used during a session. In the Authentication phase, the WPM provides the AAA server the Mobile Identification Number (MIN) of the MS and the Personal Identification Number (PIN) of the user. Preferably, the MIN is the wireless subscriber's ID (SID). The AAA server compares the MIN and PIN to the user's information stored in the directory 746. If the subscriber authentication is successful, the AAA server preferably allocates an IP address for a connection. Alternatively, the AAA contacts the DHCP server to request the allocation of an IP address. After authentication is complete, a response is sent to the PMS with the IP address and a connection is established.

In the authorization stage, a user's configuration parameters define the user's session. The AAA server receives a RADIUS request message, including a RADIUS account request message, and verifies the contents against the detail user profile. If the RADIUS message is correct, the AAA server sends an accept message, which includes a set of parameters used to configure the user's session. These configuration parameters define the users' services and network access privileges.

The Remote Access Server (RAS) 754 provides dial-in capabilities to either an MS user 718 or a landline user 720.

Other commonly available optional servers are the PIM server 750 and the e-mail server 752. The PIM server 750 provides users with personal information services, such as calendar events, reminders, contacts, and task lists, among others. The e-mail server 752 provides e-mail services such as send/receive mail, mail forwarding, and address books, among others.

Figure 8:
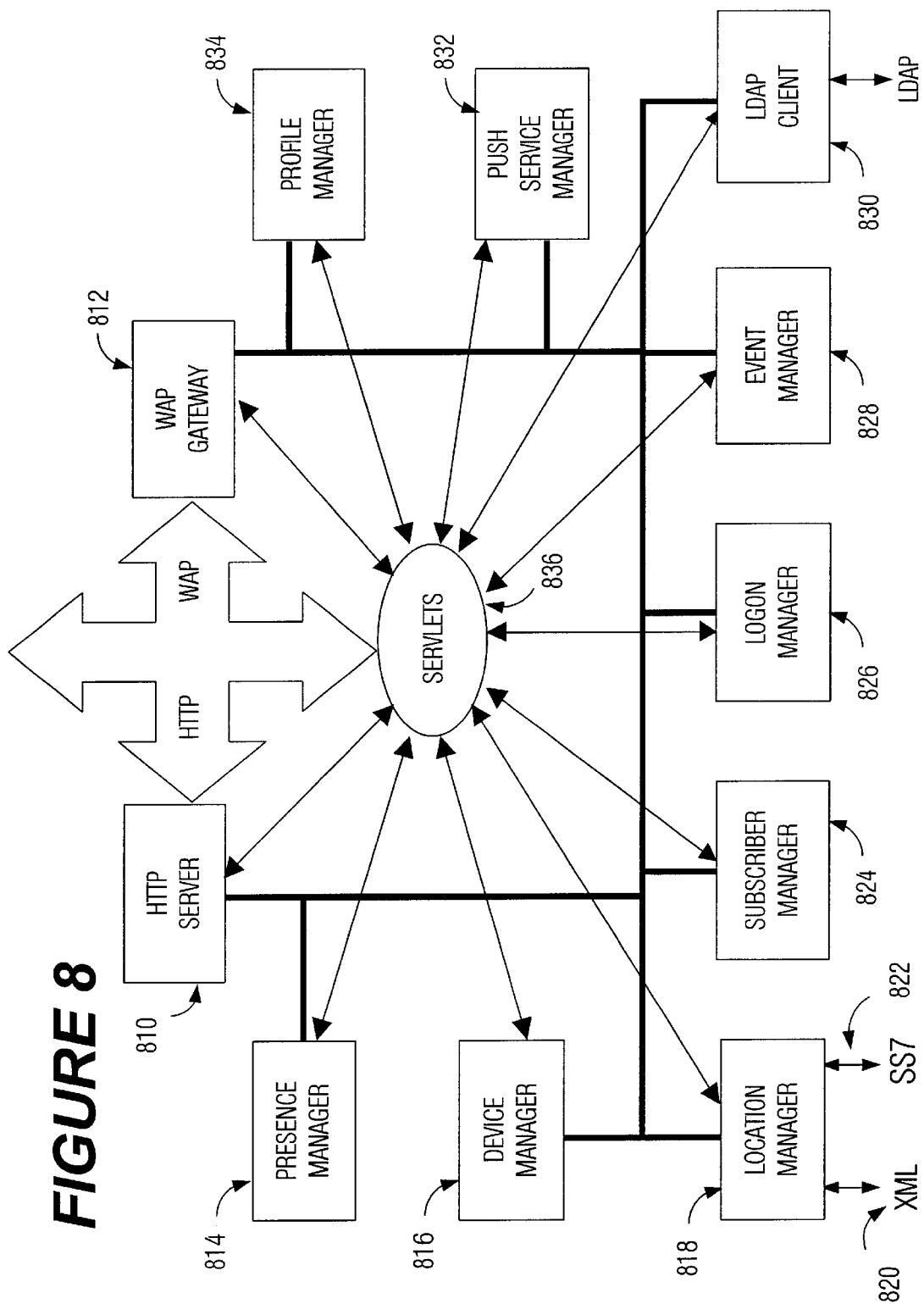
FIG. 8 schematically depicts one embodiment of the Portal Middleware Server.

FIG. 8 is one embodiment of the PMS 732 of FIG. 7. Preferably, the WPM decomposes into several functional areas, which are used individually or in combination to create customized services. The PMS' HTTP and WAP gateways 810 and 812 provide a web server interface for the WPM, providing users Internet access and information retrieval capabilities.

Additionally, the PMS contains a presence manager 814, device manager 816, location manager 818, subscriber manager 824, logon manager 826, event manager 828, Lightweight Directory Access Protocol (LDAP) client 830, push service manager 832, profile manager 834, and servlets 836. The function of each component is described in further detail below.

The presence manager 814 detects the availability of a user's device for determining a preferred method of communication by means of user profiles, device registration, on-line device detection, and wireless network queries. Refer to the Smart Push discussion below for further information.

The device manager 816 determines the device type a user is currently utilizing and maintains a device state table of the user, comprising the state of devices for active users. The device type is determined by the access method, the access port, the Terminal Identifier (TID), and the agent. Refer to the Device Aware discussion below for further information.

The location manager 818 determines whether a user request requires the user's location information. If the location manager 818 detects that location information is required, the location manager queries either the location server (location server 346 of FIGS. 3–6) or the wireless networks. As discussed above, the location server is an optional component in the wireless network. If the location server is present, the location manager queries the location server via an Extended Markup Language (XML) connection 820. If the location server is not present, however, the location manager 818 queries the wireless network via SS7 links 822. The location manager 818 is also responsible for mapping location information from wireless networks to that required by third party content providers. Refer to the Device Aware discussion below for additional information.

The subscriber manager 824 determines the subscriber identifier (SID) and performs authentication. It is preferred to use the Terminal Identifier (TID) or Mobile Identification Number (MIN) as the SID, and, therefore, allowing the WPM to easily determine if further authentication is necessary by comparing the SID and the TID. If further authentication is necessary, such as the case when the user accesses the system from other devices, the subscriber manager requests user identification for authentication purposes. Preferably, the authorization function is performed by an AAA server.

Additionally, the subscriber manager maintains the subscribers' active IP address for routing of messages. Wireless networks utilize the SID for addressing and routing messages to a specific MS user. Information networks, such as the Internet, however, utilize an IP address for addressing and routing messages. Therefore, communications between the wireless networks and the Internet require a mechanism to route messages between wireless networks and the Internet. Preferably, the subscriber manager maintains a translation table to efficiently assign and translate SIDs and IP addresses. Alternatively, the SID and/or the IP address is included in the link.

The IP address is a static IP address or a dynamically allocated IP address that may change multiple times during a single call. The allocation and assignment of an IP address to a subscriber is commonly known in the industry and will not be discussed in further detail.

The logon manager 826 provides user access to ICPs requiring user-dependent data. The logon manager 826 optionally captures user-dependent data as the user accesses secure ICPs, or the user enters the data into the user's profile for future use. Thereafter, the logon manager 826 detects the user's request and configures an appropriate request for the ICP containing the user-dependent data. Refer to the One-Click discussion below for additional information.

The event manager 828 controls the interface between the WPM and the Personal Information Management (PIM) server (PIM Server 750 of FIG. 7). The event manager 828 notifies the user of PIM events, such as calendar events and alert services, and delivers push messages.

The LDAP client 830 controls the interface between the WPM and the directory (directory 746 of FIG. 7) for accessing user information. Other functions requiring user data stored in the directory utilize the LDAP client to format and submit a request to the directory server. The directory server retrieves the information and returns the data to the LDAP client 830, who forwards the data to the requesting function.

The push service manager 832 controls the message delivery to a user depending on the device availability, the type of message, and the user preferences. Refer to the Smart Push discussion below for additional information.

Finally, the profile manager 834 maintains the user's profiles as well as maintains the user's homepage based on those profiles. The user's homepage is the preferred method of the user's interaction between the WPM and the user. Preferably, the WPM allows the user to customize the user's homepage to fulfill the user's specific needs.

The WPM maintains multiple profile schemas, designed to incorporate user preferences, network mobility patterns, administrative convenience, and network resource distributions. The Directory Service technology is the preferred embodiment to implement the profile schemas, which are preferably encrypted to provide additional security. The Directory Service technology is considered well-known in the art and will therefore not be discussed in further detail herein, except insofar as necessary to describe the present invention.

The profile schemas comprises, among others, the user profile, service profile, preference profile, device profile, usage profile, and logon profile. The inclusion or exclusion of any of these profiles is dependent on a particular application or implementation.

The user profile comprises the user's personal identities, such as, among others, names, addresses, e-mail addresses, and the user's role, which define the user's service privileges. The user profile also preferably includes a user identification parameter and value, user password parameter and value, and the request formats for service providers frequented by the user.

The service profile describes service types available for the varying MSs and service applications, such as video, voice, web access, bulk transfer, preferred web sites, preferred services, subscribed push services, contact lists, and access rights.

The preference profile contains users' preferences with regard to the services and devices. Preferences comprise device activation times, bookmarks, and notification preferences.

The device profile comprises information regarding an MS, such as, among others, device ID, serial number, capabilities, and locality information.

The usage profile comprises the detail records of device usage and service usage.

The logon profile comprises the authentication protocol, user ID, and password to logon on to a content service provider, such as a URL.

Figure 9A:
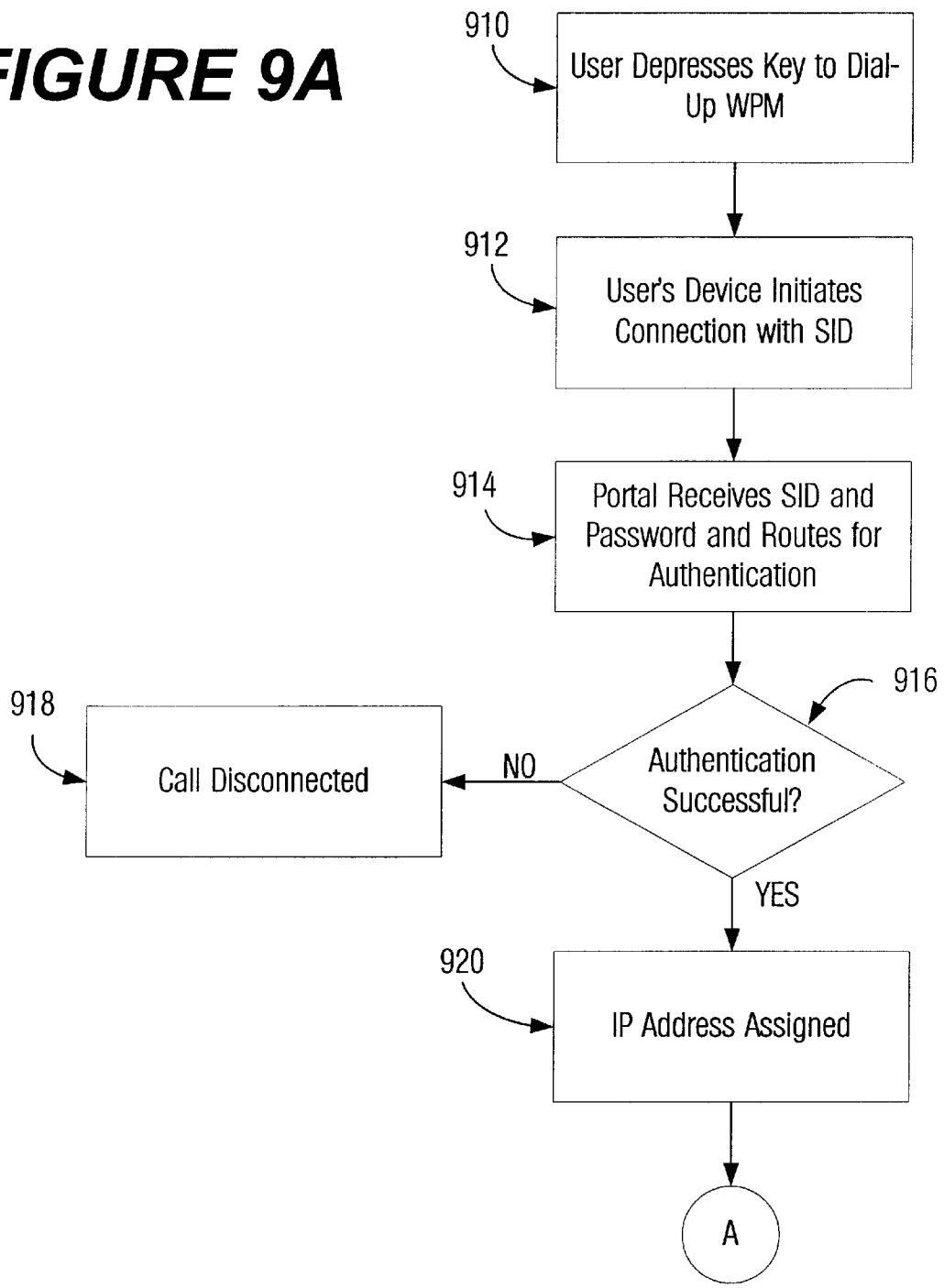
FIGS. 9A and 9B are flow charts illustrating one embodiment in which the MS user initiates WPM services.
Figure 9B:
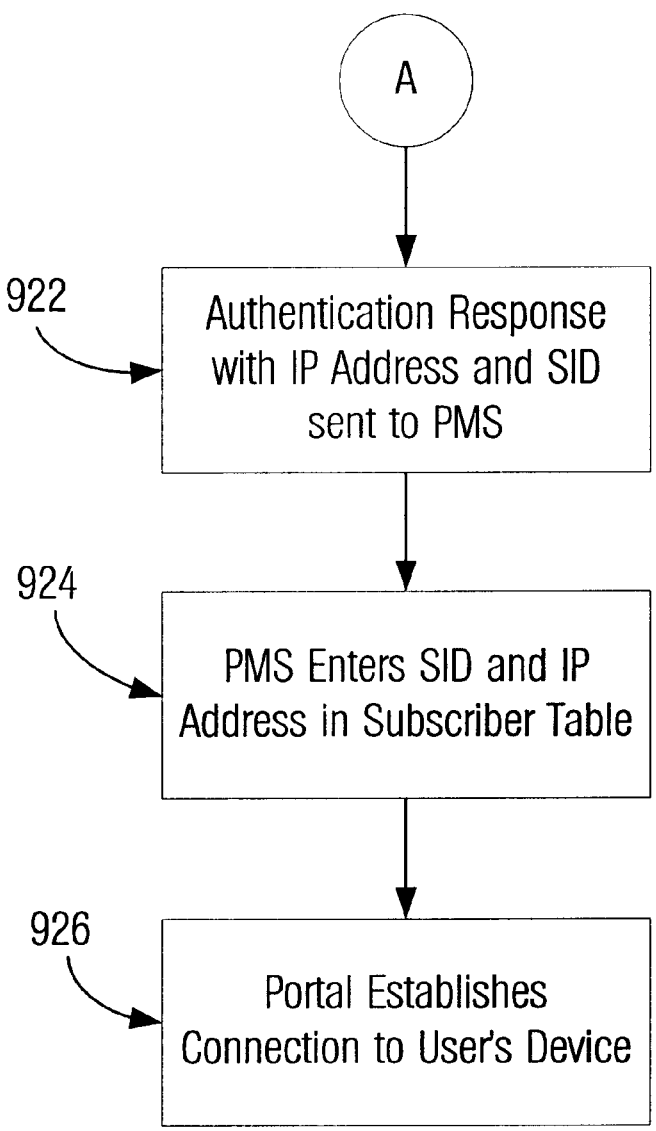

FIGS. 9A and 9B illustrate one embodiment of the present invention in which the user initiates a link with the WPM for access to the Internet and other WPM services. As illustrated in step 910, the MS user initiates the connection by preferably depressing a key on the MS. The key preferably initiates a dial-up connection to the WPM via a RAS that is supplied by the wireless network provider. Optionally, the RAS is supplied as optional server as part of the WPM. The depressed key is preferably a speed-dial connection but may be any method to initiate a connection to the WPM.

Thereafter, the MS initiates a PPP connection with the SID as the user identifier, as in step 912. The connection is a communication link establish within the wireless network, such as a PPP connection in a 2G wireless network, a Packet Data Protocol (PDP) Context Connection in a 3G wireless network, and the like. The portal receives the SID and password from the PPP connection and routes the call for authentication, as in step 914. Preferably, the authentication is performed by an AAA server. If the authentication process is unsuccessful, the MS user is denied access and the call is disconnected, as in steps 916 and 918. If the authentication process is successful, an IP address is assigned from either a list of available IP address or a DHCP server, as in step 920. The authentication response is sent to the PMS via the portal, as in step 922, and the MS user SID and IP address is added to an active subscriber list maintained by the subscriber manager as discussed above, as in step 924.

The PMS notifies the portal of the successful completion and the portal completes the connection to the WPM, granting the MS user access to the WPM services, as in step 926. Thereafter, the MS user has access to the Internet and other services, such as e-mail, PIM, and the like. Preferably, the MS user is presented a user home page from which the user selects the desired options.

The use of the Shasta as the portal provides additional capabilities in the authentication and authorization process discussed above. The Shasta is able to be configured to route messages based on the packet type and the destination address. By using the routing capabilities, the Shasta is configurable to route the authorization messages to the PMS, allowing the PMS to maintain the active subscriber information. Alternatively, if the portal is not capable of routing messages in this manner, the Radius protocol is preferably modified to route the authentication and authorization messages to the PMS.

Given the system architecture and capabilities described above, the following paragraphs describe novel and useful services that are enabled. The descriptions of the services are but one embodiment of the service that have been found to be particularly useful to MS users. It will be obvious to one skilled in the art that variations may be made to fulfill specific needs of other users.

ONE-CLICK DATA ENTRY

The one-click data entry service enables a wireless device, which typically has limited input capabilities, to easily interact with services that require long, complicated, user-specific data entry. For instance, logon information required by some content providers allow users to register and customize the web site to suit the users' particular needs and desires. The logon information, however, is typically cumbersome to enter on an MS. The present invention, however, allows the user to interact with such services without the need to enter long strings of data by storing user-dependent data on the WPM.

The one-click data entry also provides additional benefits over the prior art, namely an increase in RF resources and increase of power savings. Since the data is stored on the WPM, less data is being sent via the RF interface, thereby increasing RF resources. Additionally, since less data is being transferred, less power is required, increasing power reserves.

Figure 10:
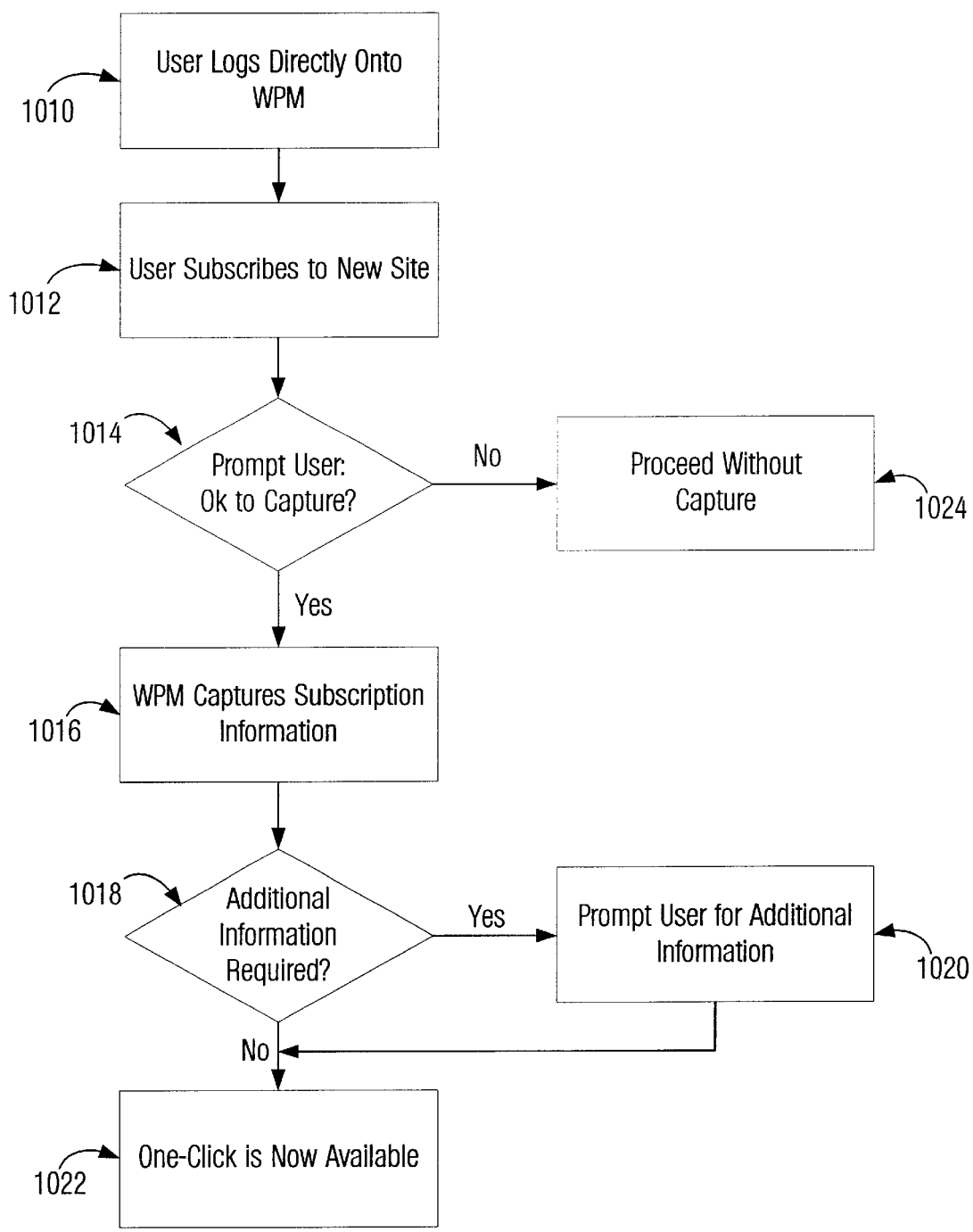
FIG. 10 is a flow chart illustrating one embodiment in which the MS user subscribes to a service via the present invention.
Figure 11:
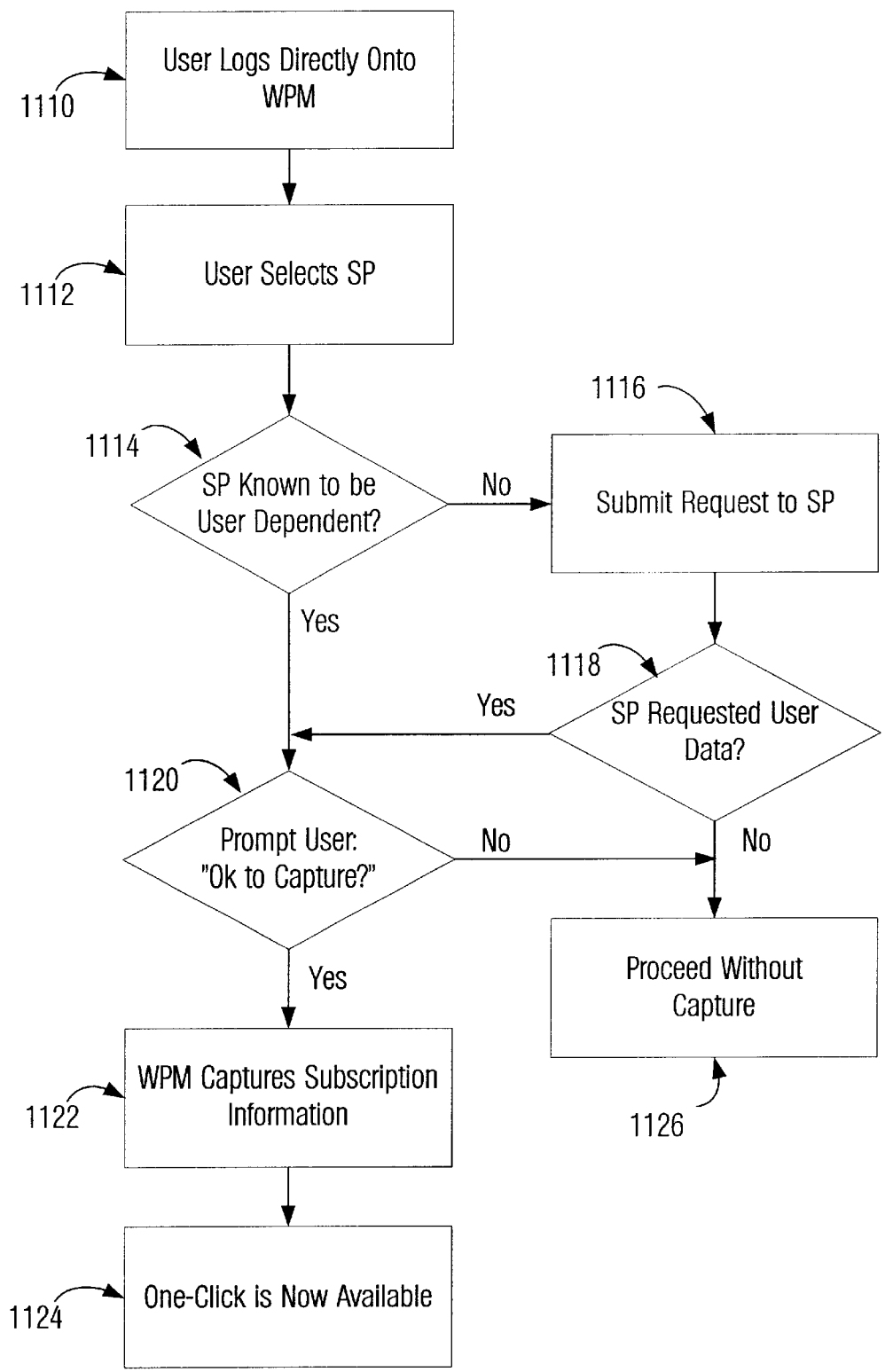
FIG. 11 is a flow chart illustrating one embodiment in which the MS user accesses a site that requires user-dependent data via the present invention.
Figure 12:
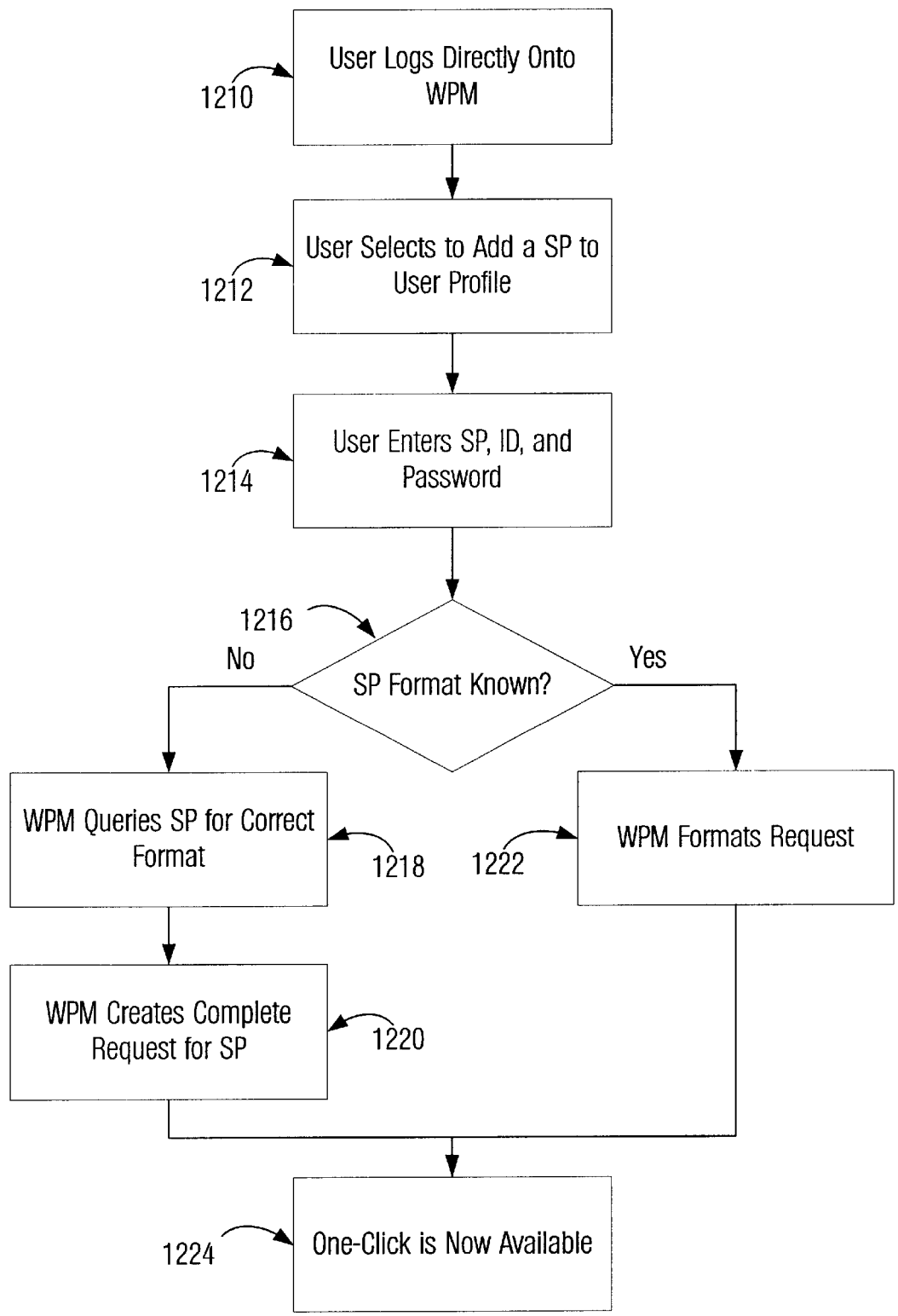
FIG. 12 is a flow chart illustrating one embodiment in which the MS user adds a service provider to the MS user's profile.

FIGS. 10–12 illustrate various methods, among others, in which the user configures the one-click data entry service. In the first option, FIG. 10, the WPM captures the logon information. In step 1010, the user logs onto the WPM and, using the WPM as a portal to other networks, such as the Internet, the user subscribes to a service requiring user-dependent data, step 1012. The WPM detects that the service requires user-dependent data based on commonly known keywords, and prompts the user for permission to capture the user data, step 1014. If the user consents to capture, the WPM monitors the interaction and captures the user, service, and site information, step 1016. Generally, the WPM will not need to request additional information from the user, step 1018, however, if the service provider uses non-standard messaging the WPM prompts the user for additional information, as in step 1020. Thereafter, one-click data entry is available to the user, as in step 1022.

If the user does not consent to the WPM capture of logon information, as in step 1014, the WPM provides access to the ICP without capturing the data, step 1024.

Another method of initializing the one-click data entry service, illustrated in FIG. 11, is useful when the user is currently subscribed to a service, such as from a wireline computer connection, and wishes access from an MS. In this situation, the user logs onto the WPM, as in step 1410, and selects a service provider that requires user-dependent data, as in steps 1112. The WPM detects that the service provider requires user-dependent data in one of two-ways. First, the service provider is known by the WPM to be an ICP that requires user-dependent data, as in step 1114. Second, after the WPM submits the information request to the service provider, as in step 1116, the WPM detects that the service provider is requesting user-dependant data by examining the response from the service provider, as in step 1118. In either case, the WPM prompts the user for permission to capture the user-dependent data, step 1120. If allowed, the WPM captures the user and service provider information and retains for later use, step 1122, enabling the one-click data entry service for the user, step 1124. Otherwise, the WPM proceeds without capturing the user information, step 1126.

Yet another method of configuring the WPM for the one-click data entry service is illustrated in FIG. 12. In this scenario, the user registers the site with the WPM, and the WPM determines the correct format by either querying the service provider or determining it is a known site.

The user first logs onto the WPM, as in step 1210, and elects to add a service provider to the user's profile, step 1212. The user enters the user-dependent data, such as the URL of the service provider, user identifier, and user password, among others, step 1214. The WPM determines whether the format of the request is known by comparing the service provider request with known service providers. If the WPM determines the format of the request is not known, step 1216, the WPM queries the ICP to determine the correct format, step 1218, and create the completed request, as in step 1220. If the format of the request is known to the WPM, the WPM formats the request with the user-dependent data, as in step 1222. Thereafter, the one-click feature is available to the user, as in step 1224.

Figure 13:
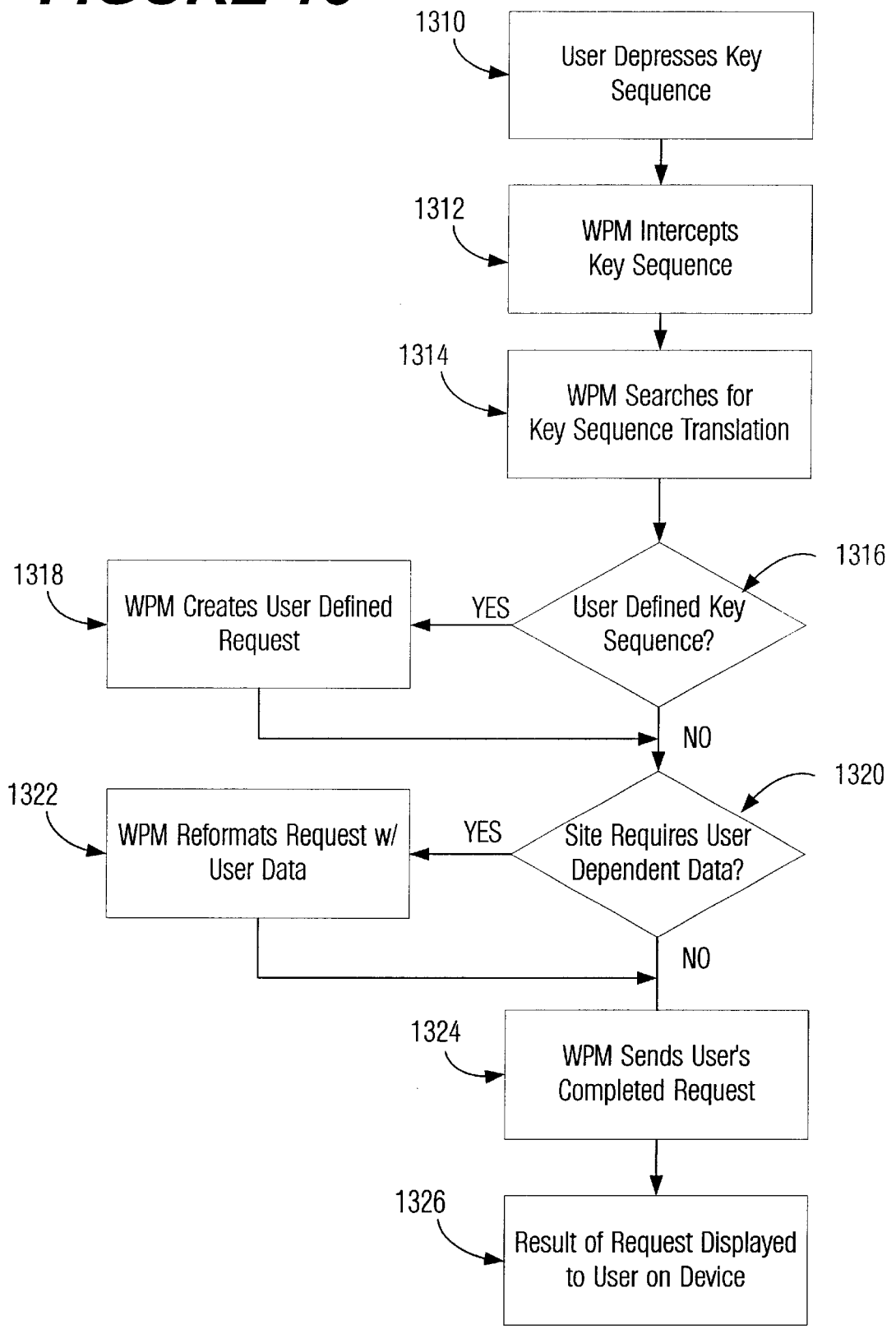
FIG. 13 is a flow chart illustrating one embodiment in which the MS user requests user-dependent data.
Figure 14:
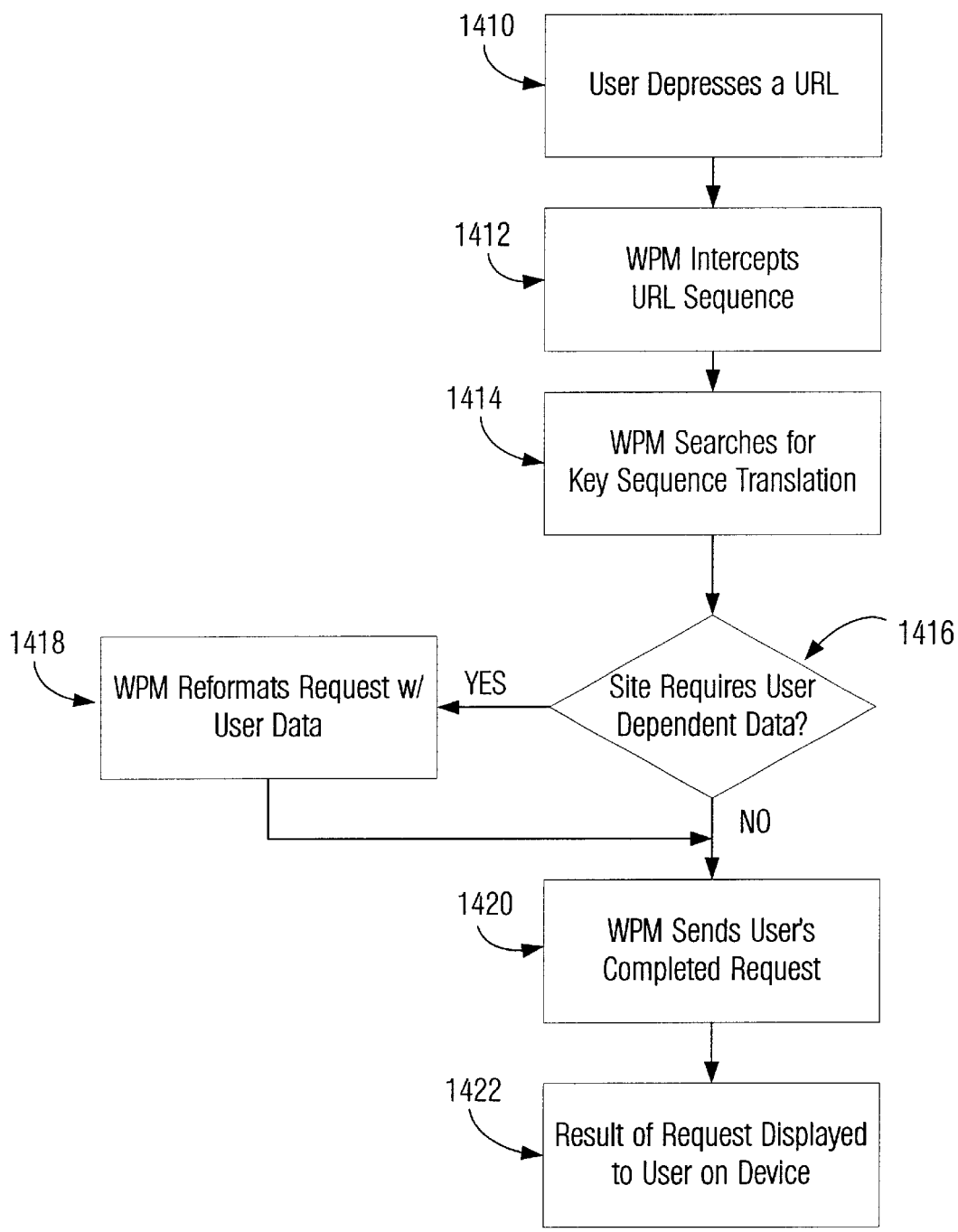
FIG. 14 is a flow chart illustrating another embodiment in which the MS user requests user-dependent data.
Figure 15:
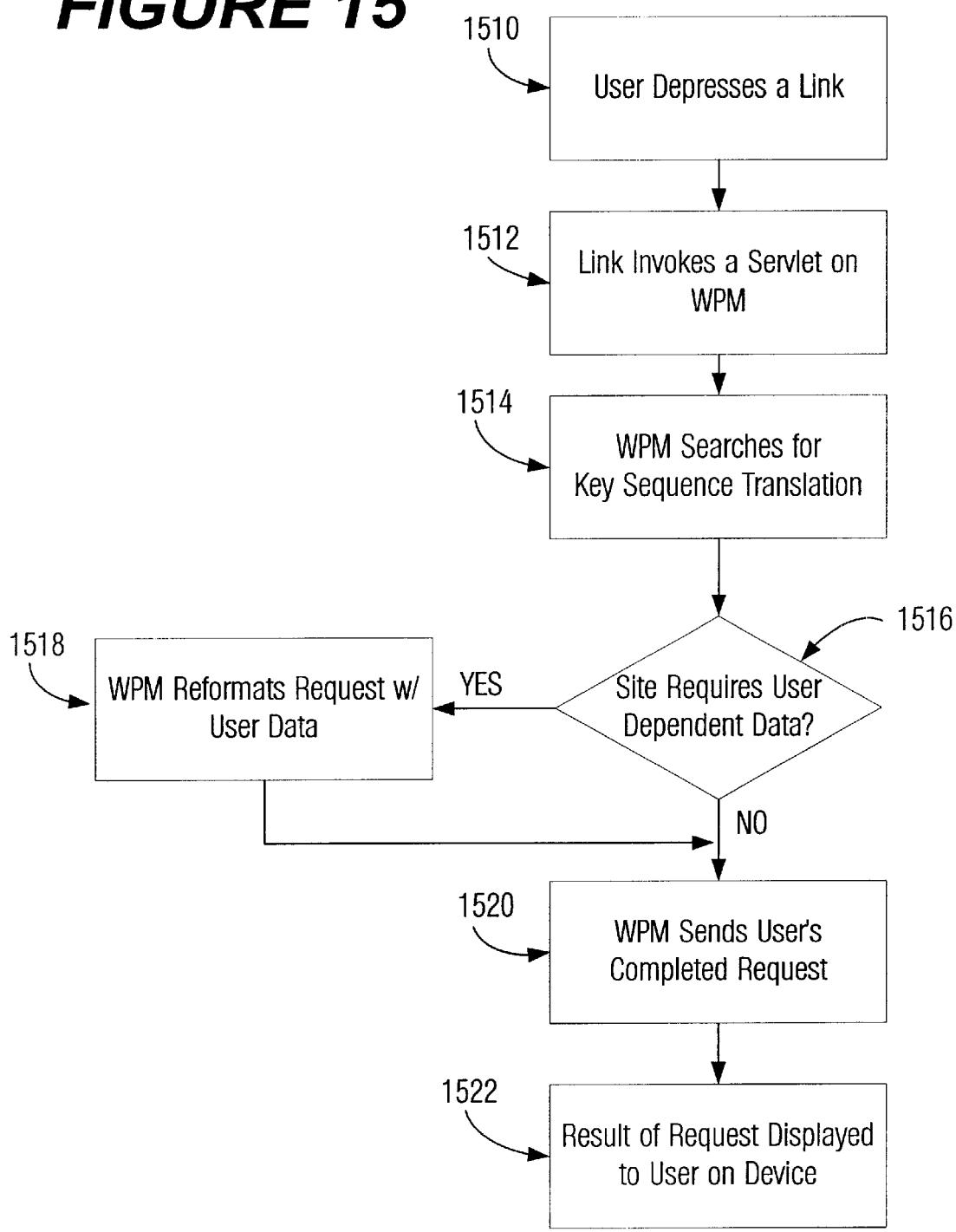
FIG. 15 is a flow chart illustrating yet another embodiment in which the MS user requests user-dependent data.
Figure 16A:
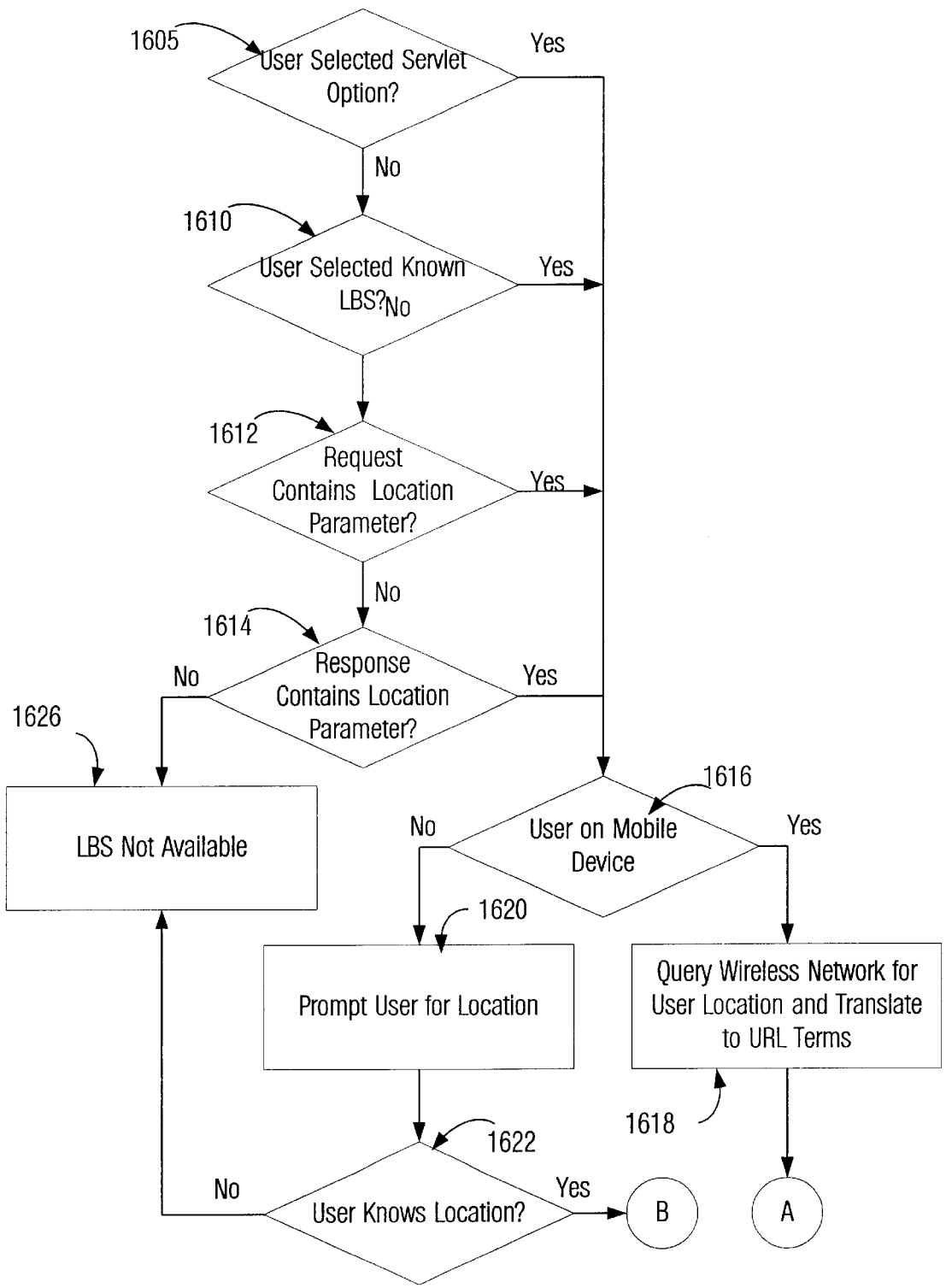
FIGS. 16A and 16B are flow charts illustrating one embodiment in which the MS user is provided location-based information.
Figure 16B:
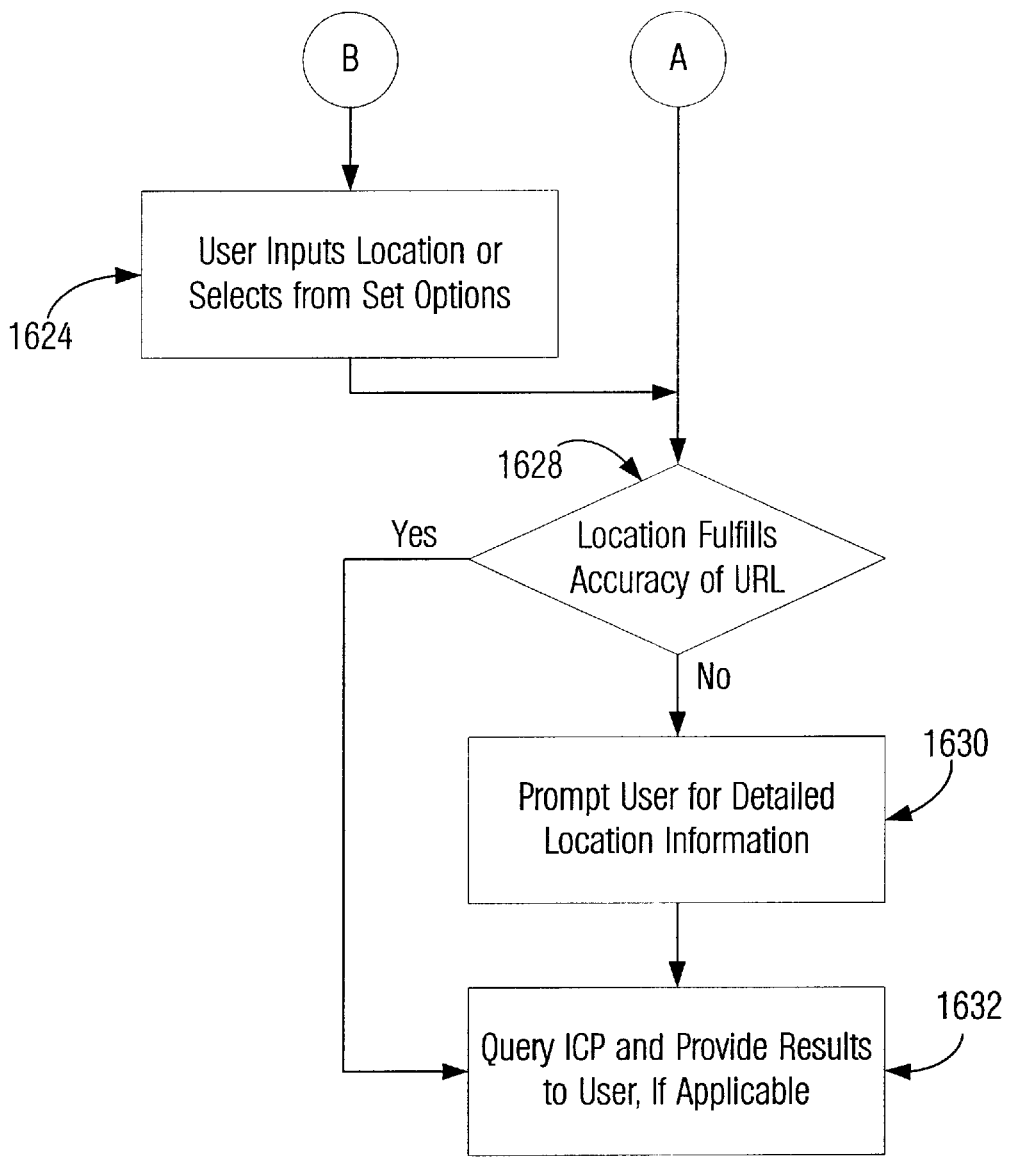
Figure 17:
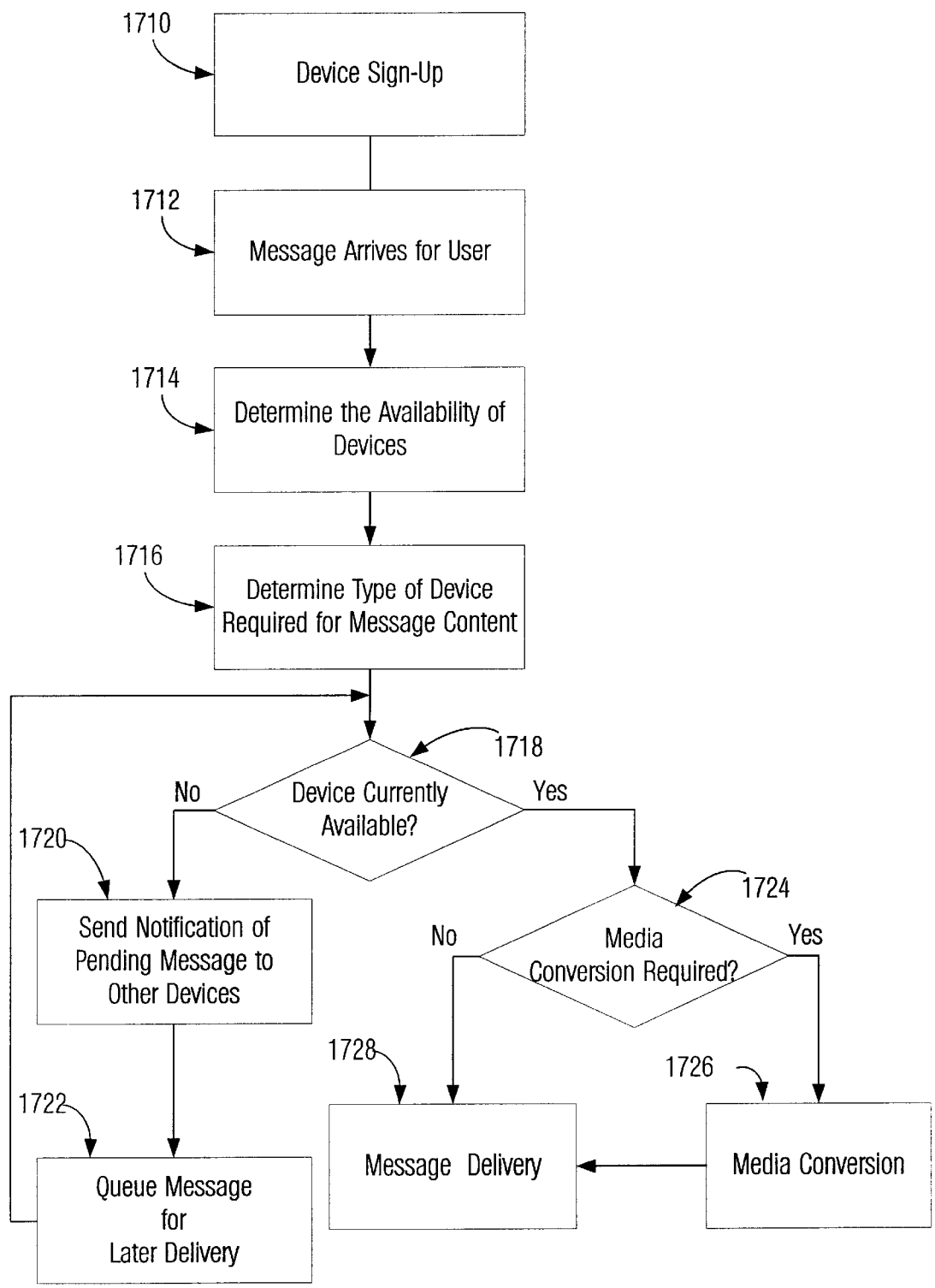
FIG. 17 is a flow chart illustrating one embodiment in which the MS user is sent messages dependent on the message type and device availability.

As illustrated in FIGS. 13–15, the user invokes the one-click data entry service by entering either a known key sequence, a URL that the WPM intercepts and reformats, or a link that invokes a translation servlet in the WPM. As in step 1310, a known key sequence, similar to a shortcut key, provides the user with the ability to enter a minimal number of keys, which are translated into a command or a series of commands. Preferably, the known key sequences comprise user-defined key sequences and a set of default shortcuts provided by the service provider to commonly requested services and information.

As used throughout this document, a key sequence is understood to comprise any means of entering data. Typically, a user will enter data from an MS by depressing keys on a keypad or keyboard, selecting an option key, selecting an option via a mouse device, and the like. Other means are understood to be included in this specification and are not to be excluded.

When the user depresses a key sequence, as in step 1310, the WPM performs a search for the depressed key sequence within the user profile, steps 1312–14. Optionally, the WPM allows the user to create user-programmed shortcut keys. If user-programmed shortcut keys are allowed, the WPM determines whether the key sequence is a user-programmed shortcut key, as in step 1016, and replaces the shortcut keystrokes with the programmed information, as in step 1318.

Next, in step 1320 the WPM determines whether the requested information requires user-dependent information, such as user identification and passwords, among others, preferably by filtering the request for user-dependent parameters. If user-dependent data is required by the information provider, the information is retrieved from the user profiles and is formatted with the request, step 1322, and the request is sent to the information source, step 1324. Finally, the result of the request is displayed to the user with minimal user interaction, step 1326.

FIG. 14 illustrates another embodiment of the one-click data entry feature in which the user enters a URL, such as the URL for a brokerage account, an auctioning service, or an e-mail service, and the like. If the user enters a URL, step 1410, the WPM intercepts the URL, step 1412, and searches the directory for a URL translation, step 1414. If the translation requires user-dependent data, preferably determined by filtering the translation, step 1416, the WPM retrieves the user-dependent data and reformats the URL with the user-dependent data, step 1418. The completed request is then sent to the service provider, step 1420, and the results are presented to the user, step 1422.

In yet another embodiment, FIG. 15 illustrates the user's ability to depress a link, such as a stock portfolio selection on the user's home page, and the like. When the user depresses a link, step 1510, the link invokes a servlet to be performed by the WPM, step 1512. The WPM translates the link, as in step 1514, and determines if the site requires user-dependent data, as in step 1516. If the translated link requires user-dependent data, the WPM reformats the request with the user-dependent data, as in step 1518. The request is then sent to the service provider, as in step 1520, and the results are presented to the user, as in step 1522.

A typical scenario where this aspect of the present invention is particularly useful is aiding the wireless user in "surfing the web." Many users take advantage of ICPs that allow the user to customize features or account information, such as brokerage accounts. In these situations, the ICPs require the user to register and to be assigned a user identifier and password. Due to the difficulty in entering the required information, MS users often choose not to access the information from an MS. This limitation, however, is overcome by the present invention.

Under the present invention, the user selects the appropriate key sequence, URL, or link from an MS. The WPM determines whether the request requires user-dependent data. If so, the WPM formats a request comprising the user-dependent data to send to the ICP with little or no further user interaction.

The preferred embodiment of the one-click data entry service is to store the one-click data entry information in the WPM. In this manner, the information is easily available for multiple MSs, as well as a wireline connection. Additionally, storing the information in the WPM provides additional security from loss or interception, thereby enabling services such as e-commerce.

E-commerce applications typically require credit card information, names, addresses, passwords, and delivery information, making security a primary issue for the MS user. By storing the information, preferably encrypted, on the WPM, the MS user can securely utilize e-commerce applications, allowing the WPM to store and transmit the user-dependent data directly to the e-business in a secure manner. In the event of loss of the MS or interception of the transmission, the secured information retained on the WPM is not accessible to unauthorized individuals. Storing the information in an encrypted state is preferable to provide an additional level of security against unauthorized access.

An alternative embodiment, however, is to store the linking information and the service logic in the MS. Under this embodiment, the functions described above as performed in the WPM are performed in the MS, and the MS transmits the completed link.

Alternatively, the one-click data entry is implemented in both the MS and a remote services platform, such as the WPM. In this embodiment, the MS retains one-click data entry information for general access purposes where security is not an issue. The remote services platform retains information for which security is an issue.

LOCATION-BASED SERVICES

The WPM furthers the utility of MSs by providing the users with the ability to request and receive location-based information. For instance, an MS user has the ability to request directions to the nearest restaurant from his current location, or sales at a particular mall are delivered to the user's PDA as he enters the mall.

The WPM determines a location request by use of several methods. The first method, as in step 1605, provides the user with pre-selected options, such as options on a personal home page and the like. The preselected options represent services available from the WPM and are performed by a servlet. When the MS user selects the preselected option from the MS, the MS transmits to the WPM, preferably a URL, which corresponds to and initiates a servlet. Since the servlet is invoked directly, the WPM is aware that the request is a location-based service and processes the request accordingly. In this instance, the format of the location request is known by the WPM. Preferably, the WPM provides the information as part of available WPM services, or requests the information from a preselected ICP.

In another method, as in step 1610, the MS transmits a shortcut, such as "local restaurant", as a request to the WPM. The request received by the MS is filtered to determine the existence of the shortcut and translates the shortcut to a location-based information request containing a location parameter. Filtering the request comprises parsing the request to determine if the request comprises a shortcut or known keywords. If the request is determined to comprise a shortcut by comparing the request to system and/or user defined shortcuts, the shortcut is replaced with a link, replacing any known keywords with user-dependent data or location values.

Preferably, the WPM selects the ICP from which to request the information. Alternatively, the MS user selects the ICP from which to request the location-based information.

In another method, as illustrated by step 1612, the request, typically a URL, is entered by the MS user and transmitted to the WPM. The WPM scans the request before transmittal to the service provider to determine if the request contains a location parameter, such as "zip code", "location", "city", and the like. For instance, the user may enter the URL of a mapping service leaving the location parameter undetermined. The WPM scans the request and upon finding the location parameter, formats a request comprising the user's location for transmittal to the service provider.

In yet another method the response from the service provider is analyzed for a location parameter, as in step 1616. Even though service providers generally utilize a few variations, such as the use of a "location" parameter in URLs, the location parameter is not standardized. As a result, this method is not preferred at the current time, but may become more feasible as standards evolve. In any of these methods, if the location parameter is found, the WPM determines how best to complete the request with the location information.

Preferably, the user's location is determined by requesting the information from the wireless networks or knowledge of a known location of a fixed device, such as a home computer. The first step in determining the location, step 1616 determines whether the user is on a mobile device. If the user transmitted the request from an MS, the user's location is ascertainable by querying the wireless networks, the technique of which is commonly known in the industry, as in step 1618. The information from the wireless network varies by the network type and is typically in terms meaningful only to the wireless networks. As a result, the user's location is translated from a network location to a location relevant to the service provider, such as a zip code. Preferably, the translation is performed by using a translation table between the wireless network location, such as a cell ID, latitude-longitude, or MSC ID, and a format required by the service provider, such as a zip code, city, or street number, among others.

For instance, the location received from the wireless network service provider, such as 35W, RICH1, and the like, are generally dependent on the network configuration and naming standards of each particular wireless network service provider. For the location information to be meaningful to an ICP, and, therefore, the subscriber, the location must be translated to a term meaningful to the ICP, such as a zip code, street address, and the like.

If the user is not on an MS, the WPM preferably prompts the user for the location, as in step 1620. Optionally, the WPM determines the user's location from the user profile or the IP address of the user's device. The greater input capabilities of the wireline devices typically allow users to enter location information with greater ease and specificity.

Additionally, the user may desire a prompt if the user is frequently at a different location than the location for which he desires information, such as a traveler in a first city who desires a list of restaurants in a second city near the airport.

If the user knows the location, step 1622, the user enters the location by any available method, including selecting the location from a list, such as home, work, or the current location, among others, or manually entering the location, and the like, as in step 1624. Otherwise, location-based services are unavailable, as in step 1626.

Next, the location is evaluated to determine if the accuracy of the location fulfills the service provider's requirements, as in step 1628. The accuracy must be such that the service provider is able to retrieve the relevant information for the user. For instance, the state in which the user is located is likely insufficient to fulfill a restaurant locator service provider's requirement. More likely, the service provider requires a zip code or cross-streets.

The WPM determines the service provider's accuracy requirements by querying the service provider or by comparing the information with known accuracy requirements, among others. If the accuracy is insufficient, the WPM prompts the user for more specific information, as in step 1630. Preferably, the user is presented a list of available options but also has the ability to enter the desired location. If the user's location is not available in the required accuracy or the user's location is not ascertainable, location-based services are unavailable, as in step 1632.

A typical example of the use of the above process is an MS user requesting restaurant information. Frequently, an MS user visiting a city does not know his/her current location, but desires directions to a nearby restaurant. The user connects to the WPM and selects from either an option from a home page or requests a specific site on the Internet with the information. In either case, the WPM detects that the URL requires location information. The WPM optionally queries the user for the location. Since the MS user is visiting a city with which he is unfamiliar, the user elects to let the WPM determine the location. The WPM queries the appropriate wireless network, such as GPS, GSM, or IS-41, among others, to retrieve the user's location. The WPM determines whether the accuracy of the retrieved location satisfies the accuracy requirement of the ICP. If more accurate information is required, the WPM prompts the user for additional information. The type and content of the prompt may varies depending on the type of user's MS, such as voice, mini-browser phone, or laptop. If the user is on a wireless phone, voice prompts are preferred. If the user is on a mini-browser phone, a simple selection list is preferred. If the user is on a laptop, more detailed information is preferred.

Once the information is available in the required accuracy, the WPM translates the location into a format required by the service provider, such as converting the latitude/longitude into a zip code. Finally, the WPM creates a URL, submits it to the service provider, and displays the retrieved information.

SMART PUSH

Another capability of the present invention is the ability to deliver messages to a user in a manner with a high likelihood that the user receives the message on a preferred device and in a preferred format, referred to as a "smart push." The preferred manner of delivery is dependent upon, as described below, the devices signed-up, the devices the user is currently operating, the content of the messages, the capability of the devices, message priority, and the preferences of the use, among other things.

Prior to using the smart push capability of the WPM, a user signs-up the device(s) to receive messages, as in step 1710. Sign-up is accomplished by accessing the WPM and notifying the WPM of the user's desire to receive messages on a particular device. The user provides information identifying the device, such as the access method, type of device, and the device's capabilities. Optionally, the WPM retains a database of possible devices and the device's capabilities, negating the need for the user to enter the device's characteristics. However, if the user enters an unfamiliar type of device, the WPM preferably prompts the user for information, comprising display abilities, storage, access method, and device identifier, among others.

Thereafter, the smart push service is ready to receive messages for the user, as in step 1712. When a message arrives, the WPM determines available devices for a user, as in step 1714. As illustrated in FIG. 18, the preferred process for determining the preferred device depends on the type of device and the method of WPM notification.

The preferred methods for determining the availability of a device comprise temporary and permanent profiles, automatic and manual registration, internal or external on-line detection, and a query of the wireless networks.

First, the user optionally creates profiles of the user's preference of devices for receiving messages, a permanent 1810 and/or temporary 1812 profile. A permanent profile is a default profile that is active when a temporary profile is unavailable or is not applicable. The permanent profile allows the user to specify when a particular device is the preferred device to receive messages. For instance, an MS user may specify that a wireless phone is the preferred device during working hours and a PDA is the preferred device during non-working hours.

A temporary profile, on the other hand, contains the same information but over-rides the permanent profile for the times specified, such as when the user goes on vacation and the preferred method of access is a cellular phone. Both profiles, however, are based on static information and, therefore, are preferable as a default if the other methods are unavailable.

Second, available devices are determined by on-line registration, either automatically 1814 or manually 1816. Automatic registration utilizes some devices' capability to download client applications. The application, in this case, sends a registration message to the WPM when the device is activated. The WPM registers the device as active in the respective user's profile. Manual registration, on the other hand, requires the user to explicitly notify the WPM that the device is activated and available to receive messages.

Due to the active nature of the manual registration process, a manually registered device is the preferred device for communications, with the exception of voice-only wireline or voice-only wireless phones, which receive the highest priority when notification is performed explicitly by on-line registration as discussed below. Automatic registration, however, was found to have lower confidence as the preferred device due to the passive nature of the registration process.

Third, on-line detection, either internal 1818 or external 1820, determines the state of a particular device. Internally, the WPM detects the user's presence in the network and indicates the device as active in the user profile when the user explicitly logs onto the WPM.

External on-line detection utilizes networking notification systems such as the Instant Messenger. Instant Messenger sends an on-line notification message to selected locations when the user is present in the system. The use of the Instant Messenger, as well as other notification systems, is well known in the art and will not be discussed in further detail. Due to the current limitations, however, this mechanism is not currently supported with voice-only devices or cellular browsers.

Another mechanism that determines the availability of a device is a direct query of an MS 1822. Wireless networks allow queries to determine whether an MS is currently activated, i.e., turned on. The mechanism to query a wireless network to determine the availability is commonly known in the art and will not be discussed in further detail herein, except insofar as necessary to describe the present invention.

Priorities assigned to the various methods above resolves conflicts when multiple devices are available for communication. Preferably, manual registration is the highest priority except in the case of voice-only devices, in which case internal on-line detection is the highest priority and manual registration is the next highest priority. Internal on-line detection is the next highest priority, except for voice-only devices as stated above. The preferred remaining priorities in descending order, if available, are external on-line detection, query, automatic registration, temporary profile, and automatic profile.

Optionally, if the network provides a message delivery confirmation, such as WAP 1.1, and the message was not received by the MS, the message is sent to the remaining MSs in order of priority until the message delivery is confirmed. If the network does not provide a message delivery confirmation, however, the message is preferably sent to the highest priority available device. Alternatively, the message is sent to all available devices.

Preferably, the subscriber is provided the ability to override the priority scheme described above, as in step 1824. The over-ride capability allows the subscriber to specify which devices and, preferably, the priorities of the devices for message delivery.

Referring back to FIG. 17, after the WPM determines device availability, the WPM determines the preferred device by selecting the highest priority device given the type of message content, as in step 1716. If the message content is textual, then the preferred order is desktop, laptop, PDA, mini-browser enabled cellular phone, PSTN, and voice-only cellular phone. For audio messages, the preferred order is PSTN, voice-only cellular phone, mini-browser enabled cellular phone, desktop, and laptop. For graphical messages, the preferred order is desktop, laptop, and PDA.

If a suitable device is not currently available, as in step 1718, the WPM optionally sends a notification message to another device(s) indicating the pending delivery of a message, step 1720. At this point, the message is queued for later delivery, as in step 1722.

If an acceptable device is available, the WPM determines whether media conversion, such as text-to-speech or voice-to-audio-file, is required, as in step 1724. If media conversion is required, media conversion is performed, as in step 1726, before the message is transmitted, as in step 1728.

The system capabilities and architecture described above further expands the ability of the smart push service. For instance, the existence of a cache server allows the ability of the push service to bookmark the location of the last push. The push service detects where the user left off and can put the user at that spot when the user returns, regardless of the device. This enables the user to access information, such as lengthy reports

DEVICE AWARE

Figure 19:
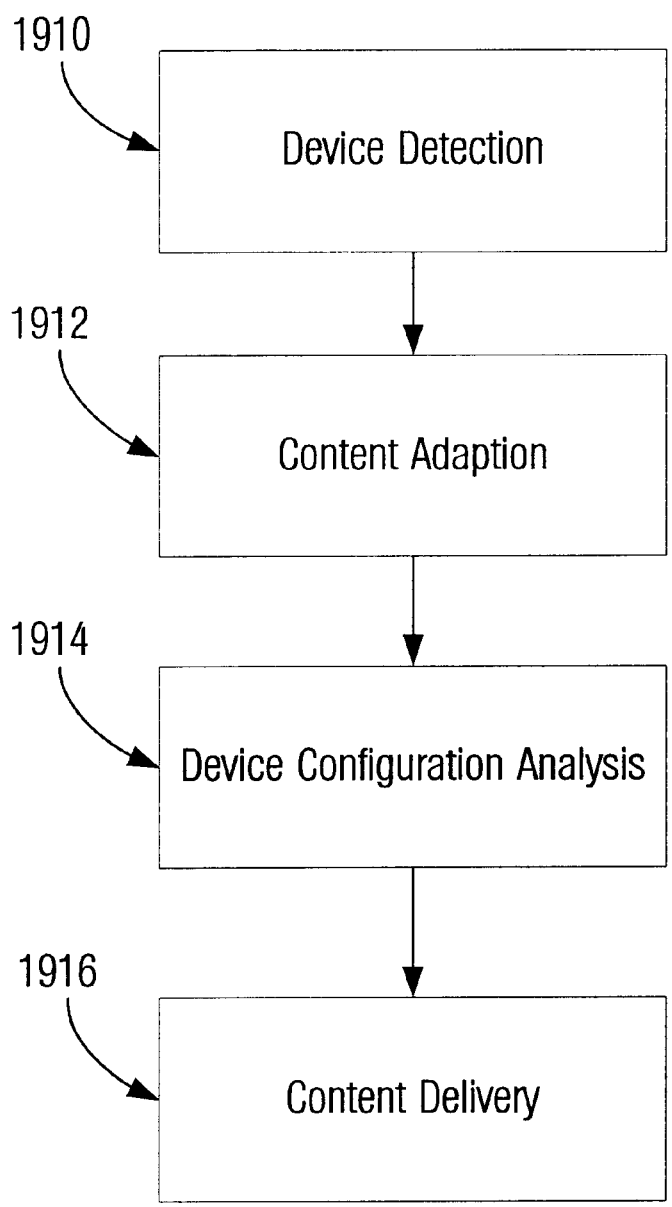
FIG. 19 is a flow chart illustrating one embodiment in which a message is formatted according to the type of device.

The increase in MSs also creates a demand for intelligent presentation mechanisms to provide information in an acceptable format for a given MS. The WPM provides this capability by a series of novel steps as illustrated in FIG. 19.

Figure 20:
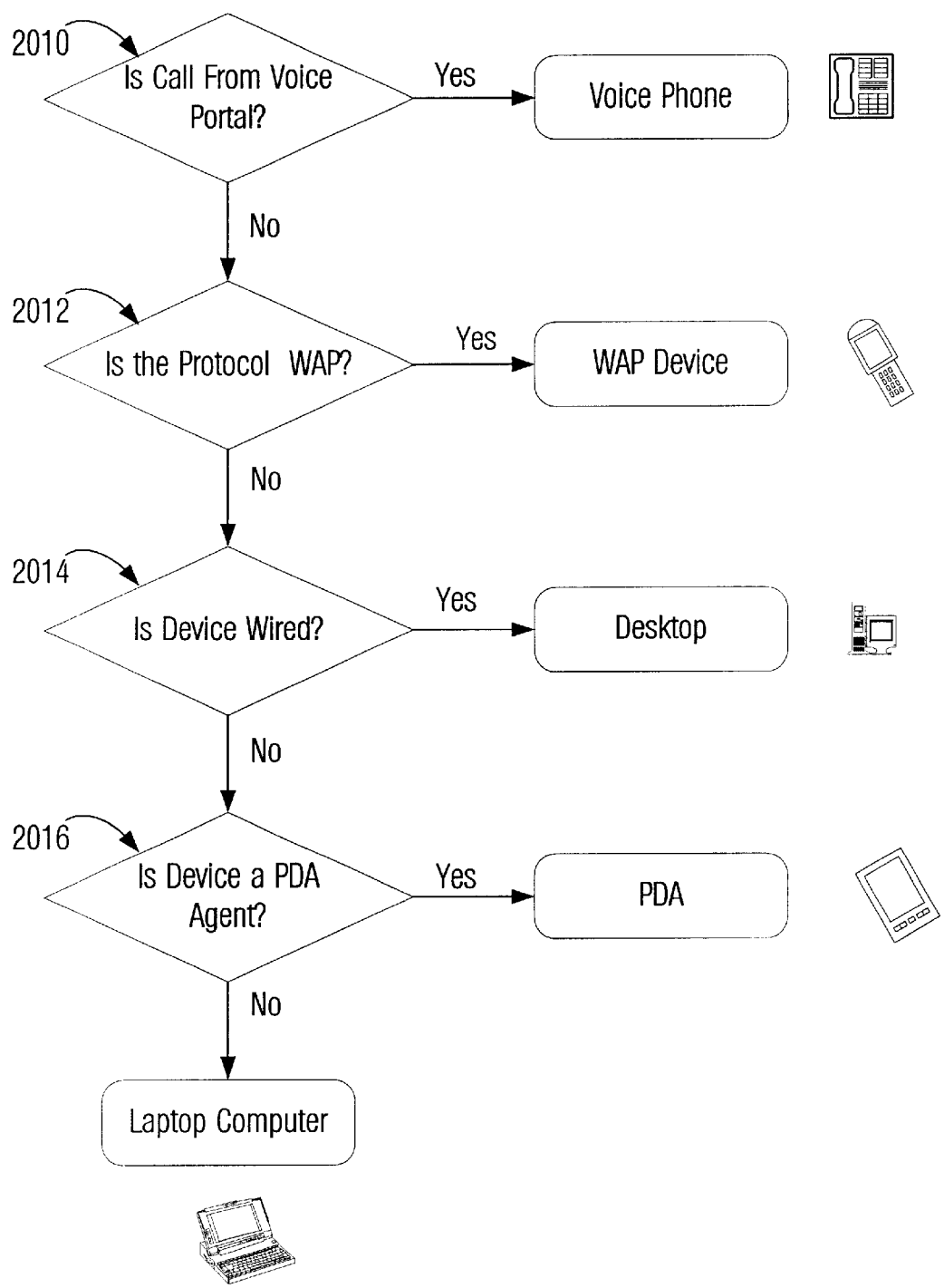
FIG. 20 is a flow chart illustrating one embodiment in which the type of MS is determined.

In step 1910, which is further illustrated in FIG. 20, the WPM detects the type of device. Referring to FIG. 20, step 2010 determines whether the call originated through a separate access method. Typically, a voice-only device accesses the WPM via a separate dial-up access and connects to the WPM via a voice channel and the PSTN. If the device is other than a voice-only device, however, the WPM evaluates the protocol to determine if it is HTTP or WAP, as in step 2012. Although both HTTP and WAP devices connect to the WPM, the WAP applications use a different port than HTTP, as defined in the WAP standards. Therefore, by determining which port is used, the WPM determines whether the device is a WAP or an HTTP device.

If the device is an HTTP device, the WPM determines whether the device is a wireline device, a PDA, or other wireless device. The WPM determines whether the device is a wireline device by evaluating the Terminal Identifier (TID) and comparing the TID with known wireline and wireless TIDs, as in step 2014. The TID identifies the type of device, wireline or wireless, but does not distinguish between PDAs and laptops because both generally use the wireless modem to connect to the WPM. Therefore, to distinguish between a wireless laptop and a wireless PDA, the WPM evaluates the user agent type in the header of the HTTP, step 2016. The user agent identifies the type of user agent, such as IE 5.0, pocket IE 2.0, WAPMAN, and the like. The user agent type is generally distinct for the type of device and, therefore, distinguishes between a PDA and a laptop.

Referring back to FIG. 19, the WPM adapts the content to the device characteristics, such as the caching ability, display size and quality, and software and hardware support, given the device type, as in step 1912. This is generally achieved in one of two methods. First, the WPM uses typical default values for each type of device discussed above. These values are not generally tailored to a specific make and model of a device but are generally a good representation of the abilities of a particular device type. Second, the WPM maintains a database of the user's available devices, allowing the WPM to format the information for a specific MS.

Next, as in step 1914, the device configuration is determined. The device configuration is determined by examining the protocol header and the user agent type. The protocol header will specify the type of protocol, such as HTTP, WAP, and the like. The user agent type will indicate the type of browser, such as IE 5.0, pocket IE 2.0, WAPMAN, and the like.

Once the device capabilities are known, the WPM formats and delivers the information to the MS, as in step 1914. Thus, the user is presented material in an appropriate form for the type of information, the protocol, and the device capabilities and configuration.

It is understood that the present invention can take many forms and embodiments. Accordingly, several variations may be made in the foregoing without departing from the spirit or the scope of the invention. For example, specific features such as the location-based services may be extracted without negating the novelty or usefulness of other aspects of the invention. Likewise, the system architecture was designed to easily add new services and features, including, but not limited to, additional servers to provide greater functionality or further take advantage of other existing products.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for providing information to at least one device of a plurality of wireless and wireline devices of varying configurations and types, wherein the device types comprise a wireline device, a voice-only phone, a Wireless Application Protocol (WAP) device, a PDA, or a laptop computer, the steps comprising:

receiving an information request from the at least one device of the plurality of wireless and wireline devices of varying configurations and types through a single wireless middleware portal, wherein the varying configuration and types comprise display capabilities, amount of memory, and/or bandwidth, wherein the middleware portal further comprises:

at least one servlet;

a plurality of service managers at least coupled to the at least one servlet;

at least one wireless gateway at least coupled to at the at least one servlet; and at least one transfer protocol server at least coupled to the at least one servlet;

detecting a device type through the single wireless middleware portal from which an information request was received;

retrieving the requested information for the device;

adapting the content for the device type; and delivering the message to the device through the single wireless middleware portal.

2. The method of claim 1, wherein the step of detecting the device type further comprises the step of determining the device type is the voice-only phone if the information request was received via a voice portal.

3. The method of claim 1, wherein the step of detecting the device type further comprises the step of determining the device type is the WAP device if the information request utilizes the WAP protocol.

4. The method of claim 1, wherein the step of detecting the device type further comprises the step of determining the device type is a desktop computer if the information request was received from the wireline device.

5. The method of claim 1, wherein the step of detecting the device type further comprises the step of determining the device type is a desktop computer if the information request was received from the wireline device by comparing a terminal identifier with a known wireline terminal identifiers.

6. The method of claim 1, wherein the step of detecting the device type further comprises the step of determining the device type is a PDA if an information request header comprises a HTTP.

7. The method of claim 1, wherein the step of detecting the device type further comprises the step of determining the device type is the laptop computer if an information request header comprises the WAP.

8. An apparatus for providing information to at least one device of a plurality of wireless and wireline devices of varying configurations and types, wherein the device types comprise a wireline device, a voice-only phone, a Wireless Application Protocol (WAP) device, a PDA, or a laptop computer, the apparatus comprising:

means for receiving an information request from the at least one device of the plurality of wireless and wireline devices of varying configurations and types through a single wireless middleware portal, wherein the varying configuration and types comprise display capabilities, amount of memory, and/or bandwidth, wherein the middleware portal further comprises:

at least one servlet;

a plurality of managers at least coupled to the at least one servlet;

at least one gateway at least coupled to the at least one servlet; and at least one server at least coupled to the at least one servlet;

means for detecting a device type through the single wireless middleware portal from which an information request was received;

means for retrieving the requested information for the device;

means for adapting the content for the device type; and means for delivering the message to the device through the single wireless middleware portal.

9. A computer program product for providing information in a format appropriate for at least one device of a plurality of wireless and wireline devices of varying configurations and types, wherein the device types comprise a wireline device, a voice-only phone, a Wireless Application Protocol (WAP) device, a PDA, or a laptop computer, the computer program product having a medium with a computer program embodied thereon, the computer program comprising:

computer program code for receiving an information request from the at least one device of the plurality of wireless and wireline devices of varying configurations and types through a single wireless middleware portal, wherein the varying configuration and types comprise display capabilities, amount of memory, and/or bandwidth, wherein the middleware portal further comprises:

at least one servlet;

a plurality of managers at least coupled to the at least one servlet;

at least one gateway at least coupled to the at least one servlet; and at least one server at least coupled to the at least one servlet;

computer program code for detecting a device type through the single wireless middleware portal of the device;

computer program code for retrieving the requested information;

computer program code for adapting the requested information for the device type; and computer program code for delivering the message to the device through the single wireless middleware portal.

* * * * *